(12) United States Patent
Harris et al.

(10) Patent No.: US 11,557,800 B2
(45) Date of Patent: Jan. 17, 2023

(54) COLD PLATE BLADE FOR BATTERY MODULES

(71) Applicant: Romeo Systems, Inc., Vernon, CA (US)

(72) Inventors: W. Porter Harris, Pasadena, CA (US); Umran Ashraf, La Mesa, CA (US); Robert Wesley Thibault, Santa Monica, CA (US); Nick Certo, Lakewood, CA (US); Prahit Dubey, Los Angeles, CA (US); Karlo Galvan, Whittier, CA (US)

(73) Assignee: ROMEO SYSTEMS TECHNOLOGY, LLC, Cypress, CA (US)

( * ) Notice: Subject to any disclaimer, the term of this patent is extended or adjusted under 35 U.S.C. 154(b) by 403 days.

(21) Appl. No.: 16/357,170

(22) Filed: Mar. 18, 2019

(65) Prior Publication Data
US 2019/0288353 A1 Sep. 19, 2019

Related U.S. Application Data

(60) Provisional application No. 62/644,243, filed on Mar. 16, 2018.

(51) Int. Cl.
*H01M 10/613* (2014.01)
*H01M 10/6555* (2014.01)

(52) U.S. Cl.
CPC ..... *H01M 10/613* (2015.04); *H01M 10/6555* (2015.04)

(58) Field of Classification Search
CPC ...... B21D 53/02; F28F 1/022; F28F 2255/16; F28F 3/12; F28F 9/0248; H01M 10/613; H01M 10/6555; H01M 10/6556
See application file for complete search history.

(56) References Cited

U.S. PATENT DOCUMENTS

| 6,032,726 A | 3/2000 | Wright |
| 2002/0101718 A1 | 8/2002 | Negishi et al. |

(Continued)

FOREIGN PATENT DOCUMENTS

| CA | 104321925 | 1/2015 |
| CN | 102209455 | 12/2008 |

(Continued)

OTHER PUBLICATIONS

Shin, KR 10-2014-0007029, Espacenet machine translation (Year: 2014).*

(Continued)

*Primary Examiner* — Adam A Arciero
(74) *Attorney, Agent, or Firm* — Snell & Wilmer L.L.P.

(57) ABSTRACT

A cold plate for a battery may comprise channels that extend from a first end of the plate to a second end of the plate or from a first side of the plate to a second side of the plate, the channels are located in parallel with each other and between the top surface and the bottom surface. The channels may be separated from each other by walls. The plate may be milled to form a first manifold on each end. The plate may also be milled to form notches in the surface(s) over the manifold. A port for the inlet and a port for the outlet of a working fluid may be inserted into the notches. The plate may have end caps, and the end caps and the ports may be welded or brazed to form a sealed enclosure. In various embodiment, the plate is an extruded plate, a cast plate, or a stamped/formed plate.

20 Claims, 22 Drawing Sheets

(56) References Cited

U.S. PATENT DOCUMENTS

| | | | |
|---|---|---|---|
| 2007/0087266 A1 | 4/2007 | Bourke et al. | |
| 2012/0085523 A1 | 4/2012 | Zaffetti | |
| 2015/0034287 A1 | 2/2015 | Otto et al. | |
| 2015/0086831 A1* | 3/2015 | Haussmann | H01M 10/625 |
| | | | 429/120 |
| 2019/0077275 A1* | 3/2019 | Capati | B60L 58/26 |

FOREIGN PATENT DOCUMENTS

| | | |
|---|---|---|
| CN | 101326657 | 10/2011 |
| KR | 20140007029 A | 1/2014 |
| WO | 2012138833 A2 | 10/2012 |
| WO | 2017022244 A1 | 2/2017 |
| WO | 2019178612 | 9/2019 |

OTHER PUBLICATIONS

International Search Report and Written Opinion in the International Application No. PCT/US2019/022817 dated May 10, 2019.
International Preliminary Report on Patentability dated Sep. 22, 2020 in Application No. PCT/US2019/022817.
EPO, Extended European Search Report, dated Feb. 17, 2022 in EP Serial No. 19768219.8.
Office Action dated Jan. 4, 2022 in Chinese Application No. 201980019835.2.
CNIPA, 2nd Office Action dated Sep. 27, 2022 in Chinese Serial No. 2019800119835.2.

* cited by examiner

SECT A-A

SECT B-B

COLD PLATE BLADE FOR BATTERY MODULES

CROSS-REFERENCE TO RELATED APPLICATIONS

This application is a non-provisional of, and claims priority to, U.S. Provisional Application No. 62/644,243, filed Mar. 16, 2018 and entitled "COLD PLATE BLADE FOR BATTERY MODULES" and which is hereby incorporated by reference in its entirety.

TECHNICAL FIELD

The present disclosure relates to a cold plate and in particular to cold plates for battery modules and manufacturing a cold plate, as well as systems and manufacturing methods for connecting an extruded cold plate to cells of a battery pack.

BACKGROUND

Electronic devices and circuitry, including batteries, may generate excess heat which may impede reliability and lead to premature failure. In some cases, the amount of heat output is related to the power input or output of the device. Techniques for managing this excess heat may include heat sinks, thermoelectric coolers, forced air systems, fans, heat pipes, and others. In some cases, electronic devices may also be heated to obtain desired operating conditions. Some approaches to thermal management of battery packs and battery cells have attempted to provide rapid and well-controlled heating and/or cooling of battery packs.

However, these prior approaches have been limited in their ability to maintain battery cells within a desirable temperature range during operation, to control maximum and minimum cell temperatures, to achieve an operational set-point temperature, or to ensure a limited range of thermal variability between cells in a battery pack. Accordingly, improved systems and methods for thermal management of battery packs and other electrical devices remain desirable.

SUMMARY

In one embodiment, an apparatus may include a plate comprising: channels that extend from a first end of the plate, linearly, to a second end of the plate opposite the first end of the plate, the plate comprises a top surface and a bottom surface parallel to the top surface, the channels are located in parallel with each other and between the top surface and the bottom surface, the channels are separated from each other by walls; a first manifold at the first end of the plate, formed by removing material from the plate at the first end; and a second manifold at the second end of the plate, formed by removing material from the plate at the second end. The apparatus may further comprise: a first port opening into the first manifold, the first port passing through one of the top surface and the bottom surface, for inlet of a working fluid to the first manifold; a second port opening into one of the first manifold and the second manifold, the second port passing through one of the top surface and the bottom surface for outlet to the working fluid from one of the first manifold or the second manifold; a first end cap and a second end cap, and wherein the plate, the first end cap, the second end cap, the first port and the second port are connected to form a sealed enclosure. The plate, in various example embodiments, is an extruded plate.

In one embodiment, a method for manufacturing a cold plate may include extruding a metallic material through a die to form an extruded plate, where the extruded plate comprises channels, formed by the extruding process, that extend from a first end of the extruded plate, linearly, to a second end of the extruded plate opposite the first end of the extruded plate, the extruded plate comprises a top surface and a bottom surface parallel to the top surface, the channels are located in parallel with each other and between the top surface and the bottom surface, the channels are separated from each other by walls formed by the extruding process. The process may further comprise milling the first end of the extruded plate to form a first manifold, milling the second end of the extruded plate to form a second manifold, milling a first notch in the top surface over the first manifold, milling a second notch in the top surface over one of the first manifold or the second manifold, placing, in the first notch, a first port for inlet of a working fluid to the first manifold, placing, in the second notch, a second port for outlet of the working fluid from one of the first manifold or the second manifold, forming a first end cap and a second end cap, and welding the extruded plate, the first end cap, the second end cap, the first port and the second port to form a sealed enclosure. The welding can be friction welding. In various embodiments, the extruded plate is a cold plate blade configured for mounting in a vehicle and for bonding battery cells of a battery pack directly to the cold plate blade. In an example embodiment, the cold plate blade is a tensile stressed skin with a compressive structure.

In some examples of the method and apparatuses described above, the first endcap and second endcap each comprise a flow directing structure that may be inserted into the first manifold and second manifold respectively to direct flow of the working fluid.

In some examples of the method and apparatuses described above, the flow directing structure causes the working fluid from the first port to flow in a first channel and in a second channel that may be adjacent to the first channel, linearly, in parallel, in the same direction, from the first end to the second end of the extruded plate.

In some examples of the method and apparatuses described above, the flow directing structure causes the working fluid from the first port to flow in a first channel from the first end to the second end of the plate, and then back from the second end to the first end in an adjacent channel in a serpentine manner.

BRIEF DESCRIPTION OF THE DRAWINGS

With reference to the following description, appended claims, and accompanying drawings:

DETAILED DESCRIPTION

Figure 1A:
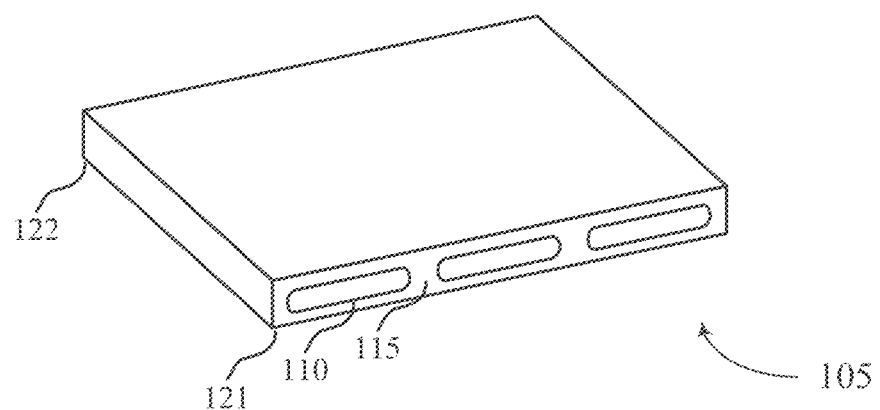
FIGS. 1A and 1B illustrate an example extruded plate formed using an extrusion process in accordance with aspects of the present disclosure.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended statements.

For the sake of brevity, conventional techniques for manufacturing a cold plate using an extrusion process, friction stir welding, stamping, brazing, die casting, or sheet metal, operation, measurement, optimization, and/or control, may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical system or related methods of use.

A thermal management system in accordance with principles of the present disclosure may be configured with any suitable components, structures, and/or elements in order to provide desired dimensional, mechanical, electrical, chemical, and/or thermal properties.

A "battery pack" as used herein describes a set of any number of battery cells, interconnected in series or parallel or a combination of series and parallel, to provide energy storage and/or electric power to a system as a single integrated unit. An example of a battery pack would be an electric vehicle lithium-ion battery pack, which can consist of thousands of cylindrical lithium ion battery cells.

A "battery cell" as used herein describes an electrochemical cell that is capable of generating electrical energy from a chemical reaction. Some battery cells can be rechargeable by introducing a current through the cell. Battery cells come in different types, such as lead-acid, nickel cadmium, nickel hydrogen, nickel metal hydride, lithium ion, sodium nickel chloride (a.k.a. "zebra"), based on the chemical reaction used to generate the electric current. Because battery cells produce electricity based on a chemical reaction, the temperature of the cell can influence the efficiency at which the electricity is produced. Battery cells can also be fuel cells, such as hydrogen-oxide proton exchange membrane cells, phosphoric acid cells, or solid acid cells. Principles of the present disclosure may desirably be applied to a wide variety of battery cell types, and are not limited to a particular battery cell chemistry, size, or configuration.

A "heat pump" as used herein describes a system that moves thermal energy from one part of a system, known as a "heat source", to another part of the system, known as the "heat sink", by the application of an external power source. Typically, the heat is transferred by the movement of a fluid cycling between the heat source and the heat sink. Examples include reversible two-phase refrigerant systems and single-phase ethylene-glycol systems.

A "vapor chamber" (or "heat pipe") as used herein describes a heat-transfer device that combines the principles of both thermal conductivity and phase transition to efficiently manage the transfer of heat between two interfaces.

The term "extrude" or "extrusion" may refer to the process of shaping a material such as metal or plastic by forcing it through a die.

In accordance with an example embodiment, an apparatus may include a cold plate. The cold plate may comprise an extruded plate that comprises channels extending linearly from a first end of the extruded plate to a second end of the extruded plate. The extruded plate may further comprise first and second manifolds formed at respective first and second ends of the extruded plate. The cold plate may further comprise an inlet port and an outlet port, each associated with one of the manifolds for communicating a working fluid through the cold plate via the manifolds. The cold plate may further comprise a first end cap closing off the first manifold and a second end cap closing off the second manifold. In an example embodiment, the extruded plate, the first end cap, the second end cap, the first port and the second port are welded to form a sealed enclosure. In an example embodiment, the extruded plate, the first end cap, the second end cap, the first port and the second port are brazed to form a sealed enclosure. In accordance with an example embodiment, the cold plate can be connected directly to battery cells with only an epoxy layer and a UV coating between the cell and the cold plate.

Figure 1B:
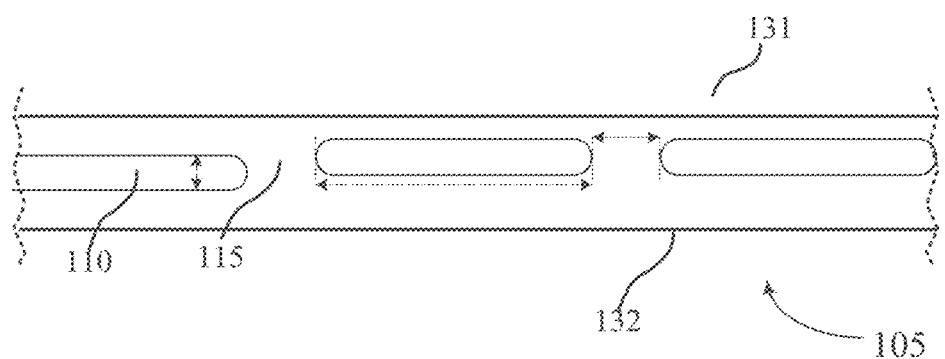

With reference now to FIGS. 1A and 1B, a cold plate may comprise an extruded plate 105. The extruded plate 105 is formed using an extrusion process. Extruded plate 105 may incorporate aspects of extruded plate 205, 305, 405, 505, and 605 as described with reference to FIGS. 2, 3, 4, 5, and 6. In various example embodiments, the cold plate is thin relative to its width and length and is therefore also described herein as a cold plate blade.

In an example embodiment the extruded plate 105 is made by extruding a metallic material through a die. In one example embodiment, the metallic material is an aluminum alloy. For example, the metallic material may be 6063 Aluminum Alloy. However, the metallic material can be any extrudable metal with good thermal conductivity and/or good ductility. In accordance with various aspects, an extruded plate 105 with good ductility can withstand impacts loads, with low deformation. In some cases, the cold plate blade is ductile to achieve vibration, shock, and impact performance. In an example embodiment, the cold plate is light weight, having, for example, less than 8% of the module mass.

In another example embodiment, the extruded plate 105 is made of any suitable material. For example, the extruded plate 105 may be made of plastic or composites. In an example embodiment, the plastic may be a thermally conductive plastic.

In some example embodiments, extruded plate 105 may include channels 110 and walls 115. In an example embodiment, the extruded plate 105 comprises channels 110, formed by the extruding process, that extend from a first end 121 of extruded plate 105, linearly, to a second end 122 of extruded plate 105 opposite the first end 121 of extruded plate 105. Extruded plate 105 may comprise a top surface 131 and a bottom surface 132 substantially co-planar to the top surface 131. In some example embodiments, substantially co-planar refers to plus or minus 5 degrees.

The channels 110 are separated from each other by walls 115 formed by the extruding process. Each channel may be defined by the walls 115 and the top and bottom of the channel (associated with the top surface 131 and bottom surface 132, respectively). In some cases, the channel to channel separation is at least 10 mm. Stated another way, in some example embodiments, walls 115 are 10 mm thick, though they can be any suitable size. In other example embodiments, the channel to channel separation is at least a distance suitable for required minimum flow of the extruded metal to form walls 115.

The walls 115 may be a part of and extruded during the formation of extruded plate 105. In some cases, the walls 115 are flow separators. In some cases, the walls 115 between channels 110 are no thicker than necessary for extrusion purposes. In some cases, the walls 115 between channels 110 are thicker than extrusion would dictate to cause better flow distribution. In an example embodiment, the walls 115 do not provide the primary structural integrity of the cooling plate blade.

The channels 110 may be any suitable shape. In some cases, the channels 110 are rectangular in shape. In some cases, the channels 110 are all the same size. In some cases, the channels 110 can be of different sizes from other channels 110. For example, in some cases, the width of the first channel and width of the second channel are different from each other. In some cases, the channels 110 are 2 to 2.5 mm in height and 26 mm in width with an aspect ratio about 0.1. Moreover, the channels 110 can be of any suitable height and width and aspect ratio to achieve desired thermal resistance of the cold plate.

In some cases, the channels 110 are configured to simulate the thermal conductivity of a material with micro-channels. In an example embodiment, the channels 110 are configured to facilitate the flow of a working fluid. In some cases, the working fluid comprises one of: a gas and a liquid. In an example embodiment, the working fluid comprises one of: a refrigerant (e.g., R134a, or R1234yf), air, a coolant fluid, and a glycol based solution. In an example embodiment, the working fluid is circulated by a heat pump or the like. In other example embodiments, the working fluid comprises $CO_2$ and is used in connection with $CO_2$ based vapor compression cycles. In such configurations, the channels 110 can be modified to have blockages to control pressure of the working fluid for performance.

In an example embodiment, the cold plate blade is of any suitable size. In some cases, the cold plate blade is 700-800 mm long from first end 121 to second end 122. However, the cold plate blade can be any suitable length. In some cases, the cold plate blade is 300-400 mm wide. However, the cold plate blade may be any suitable width. In some cases, the cold plate blade width is limited by the die size. In some cases, cold plate may be formed by welding a first cold plate to a second cold plate along their respective sides to form a super cold plate blade. For example, two 185 mm cold plate blades can be welded together to form a 370 mm wide cold plate blade. In some cases, the cold plate blade is 5.5 mm-6 mm thick from the first surface to the second surface. However the cold plate blade can have any suitable thickness.

In accordance with an example embodiment, the cold plate blade has a stiffness that is suitable for the vibration and impacts experienced by a battery pack in a vehicle. In one example embodiment, a blade with an aspect ratio [t/W] of 0.017 has a first natural frequency over 55 Hz (free) and over 230 Hz (fixed on both ends). In other example embodiments, the blade has a first natural frequency over 30 Hz, over 40 Hz, or over 50 Hz (free), and over 200 Hz, 210 Hz, 220 Hz (fixed on both ends). The significance of the first natural frequency ranges is to distinguish the relatively stiff cold plate blade from microchannels that are not stiff. Microchannels have a first natural frequency less than about 5 Hz.

Because microchannels alone lack stiffness, if one were to support batteries of a battery pack with the microchannels without any additional structural support, then ordinary vibration and impact shocks would cause the microchannels to move relative to the battery cells. This would eventually cause the bond between the microchannels and the battery cells to fatigue and separate. Thus, when microchannels have been used for cooling, they are connected to a thick/stiff support structure.

Figure 9A:
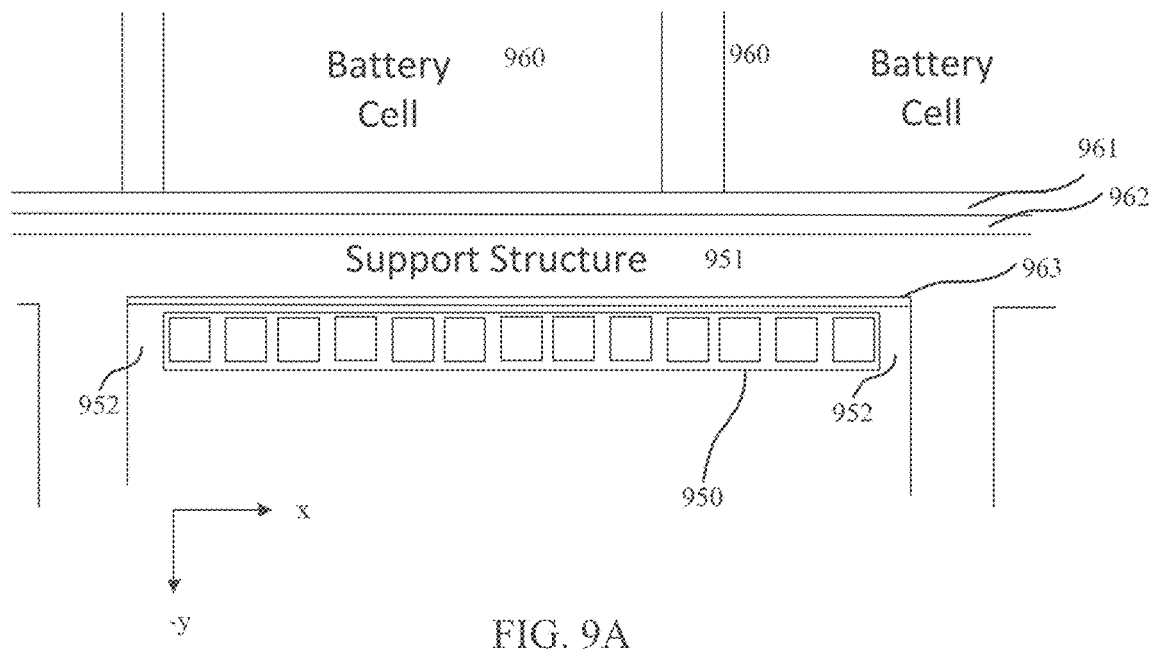
FIGS. 9A and 9B illustrate contrasting example stack-ups for cooling a battery pack in accordance with aspects of the present disclosure.

With reference now to FIG. 9A, a simple microchannel strip 950 is used to cool a battery pack comprising cells 960. A stack-up associated with the microchannel strip 950 may comprise: a battery cell(s) 960, a first epoxy layer 961, a coating 962, a support structure 951, a second epoxy layer 963, and a microchannel strip 950. The coating 962 may provide electrical isolation between the battery cell(s) 960 and the support structure 951. In various embodiments, the coating 962 may be an Ultra Violet coating, a powder coating, an anodizing coating, an epoxy, or any other coating commonly known in the art. The first epoxy layer 961 bonds the battery cell 960 to the support structure 951, and the second epoxy layer 963 bonds the microchannel 950 to the support structure 951. Moreover, a UV coating layer 962 may be placed between the battery cell 960 and support structure 951. Such manufacturing techniques involve multiple steps, and the stacking of discrete components (namely the battery cell, the support structure, and the microchannel. This stacking leads to tolerance errors and increased thermal resistance, particularly the added thermal resistance of the extra epoxy layer and additional support structure.

A microchannel strip cold plate also suffers greater thermal resistance due to gaps. Because the microchannel strip structures are narrow, they are laid down in strips, and inevitably, there will be at least minor gaps 952 between a first microchannel strip and a second microchannel strip. These gaps may include the space between the microchannel strip 950 and the support structure, gaps due to the support structure, and gaps between two side by side strips. These gaps can be reduced by reducing tolerances (at increased manufacturing costs), but the gaps that remain will be filled with some material or air, that often have higher thermal resistance. Thus, these gaps increase thermal resistance away from the cells both in the x direction as well as in the −y direction.

Figure 9B:
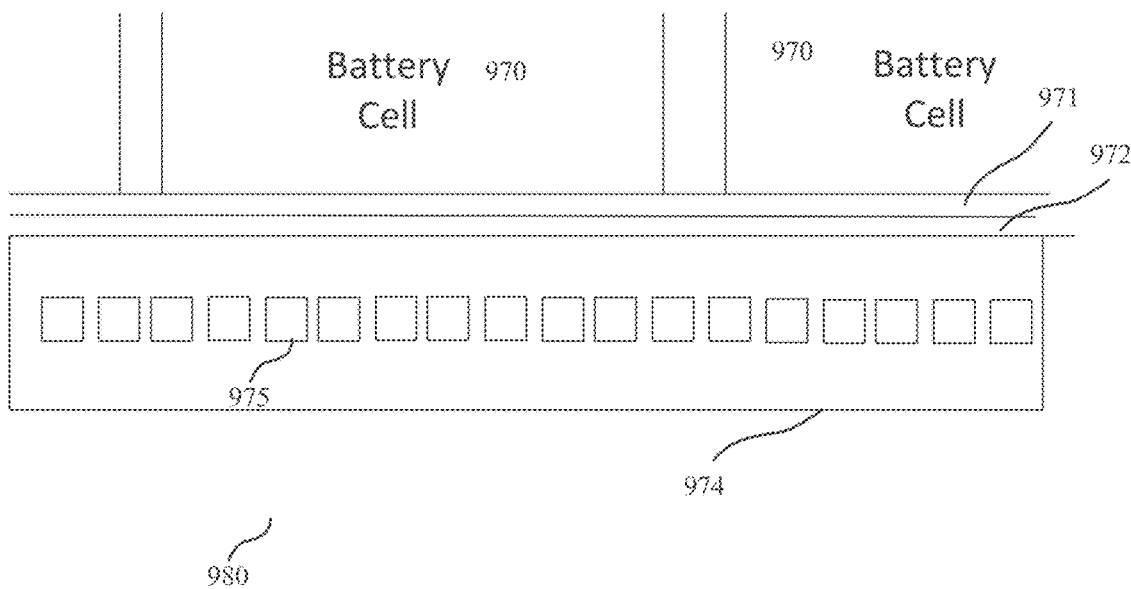

In contrast, with reference to FIG. 9B, the extruded cold plate blade 974 described herein comprises channels 975 integrated into a support structure, such that the extruded cold plate blade has sufficient stiffness to support the cells, yet a low total thermal resistance of the stack-up. In an example embodiment, a stack-up associated with the cold plate blade 974 comprises: a battery cell 970, an epoxy layer 971, a coating layer 972, and the cold plate blade 974. This example embodiment is easier to manufacture than the microchannel example above because there are fewer discrete parts to connect. In an example embodiment, the system 980 comprises a cold plate blade 974, a coating 972 on a surface of the cold plate blade 974, and a battery cell 970 connected to the cold plate blade 974 and coating 972 via an epoxy layer 971. The coating 972 may provide electrical isolation between the battery cell(s) 970 and the cold plate blade 974. In various embodiments, the coating 972 may be an Ultra Violet coating, a powder coating, an anodizing coating, an epoxy, or any other coating commonly known in the art.

The cold plate blade, in an example embodiment, may be attached to the battery pack across a plurality of cells. Thus, the cold plate blade can span multiple cells with no air gaps.

Thus, the cold plate blade may reduce tolerance related issues in design/manufacturing. The cold plate blade may also eliminate thermal resistance that may arise due to air gaps in the microchannel example above. The cold plate blade may also reduce the overall thermal resistance by eliminating at least the second epoxy layer and its associated thermal resistance, if not also by reducing the thickness of metal between the battery cell and the working fluid. In an example embodiment, the metal between the cold plate blade channel and the battery cell is about 1.75 mm thick, or 1 mm-2.5 mm thick, or 0.5 mm-3 mm thick, or any suitable thickness.

In an example embodiment, the cold plate is a monocoque cold plate blade. A monocoque cold plate blade, in one example embodiment can be described as a structural skin wherein the structural system has loads that are supported through an object's external skin, similar to an egg shell. In other example embodiments, the monocoque cold plate blade is described as an object that has an external skin that carries both tensile and compressive forces within the skin and is void of a load carrying internal frame. In an example embodiment, the monocoque cold plate blade has an external skin that is a tensile stressed skin with a compressive structure.

Although described herein principally as an extruded plate 105 formed in one extrusion pull, or as an extruded plate 105 formed by placing multiple extruded plates end to end to form an extruded cold plate with channels from one end to the other, it is noted here that other manufacturing methods may be used, and that the cold plate can comprise any device that is structurally similar to the cold plate examples described herein. For example, the cold plate can be formed by separately making a top portion of the cold plate and a bottom portion of the cold plate. The top portion and/or bottom portion may comprise the channels extending from a first end to a second end of the cold plate, such that when combined together, the structure is similar to that described in connection with FIG. 1A. The top and bottom portions may be formed by extrusion, formed by casting, formed by injection molding, formed by additive manufacturing, formed by reductive manufacturing, formed by stamping/forming, and/or any other suitable manufacturing techniques. The top and bottom portions may be connected together by any suitable manufacturing technique, such as friction welding, brazing, stamped/formed design, structural bonding, laser welding and or the like. Moreover, in a unique embodiment, the top portion may be over-molded over the bottom portion.

Moreover, in this example embodiment, the top portion may comprise a first material, while the bottom portion comprises a second material that is different (dissimilar) from the first. For example, the top portion could be a very thermally conductive material (e.g. Aluminum), and the bottom portion could be a relatively low thermal conductivity (compared to the top portion) material (e.g., steel or molded plastic). In this manner, the heat from the batteries is conducted to the working fluid in the channels, but heat from other structures (e.g. from the vehicle chassis, or other structures supporting the battery pack) is not as easily conducted to the working fluid. This is significant because the working fluid is thus configured to primarily cool the batteries. In this manner, the system is configured to have its battery cooling efficiency be higher than that of a system having the top and the bottom of the cold plate blade both comprising the same material. Stated another way, the cold plate blade serves as both a heat sink to the battery cells and an insulator (relatively speaking) to the environment on the side away from the battery cells.

In an example embodiment, the cold plate blade minimizes the amount of material and number of interfaces the heat passes through from the battery cell to the working fluid. Moreover, in an example embodiment, the channels are not microchannels (having a hydraulic diameter calculated to be about 10-200 micrometers), but are minichannels (having a hydraulic diameter calculated to be about 200 micrometers-3 millimeters), or are conventional channels (larger than 3 millimeter hydraulic diameter). In an example embodiment, the hydraulic diameter of a rectangular channel is calculated as 4*area/perimeter. In various example embodiments, the cold plate blade is configured to uniformly remove heat from a large area with many heat sources. In an example embodiment, the cold plate blade channels are sized to prevent choked flow. For example, the channels may comprise conforming divots in top and bottom, zig-zag surfaces, or any shapes or structural devices to create turbulent flow.

Figure 2A:
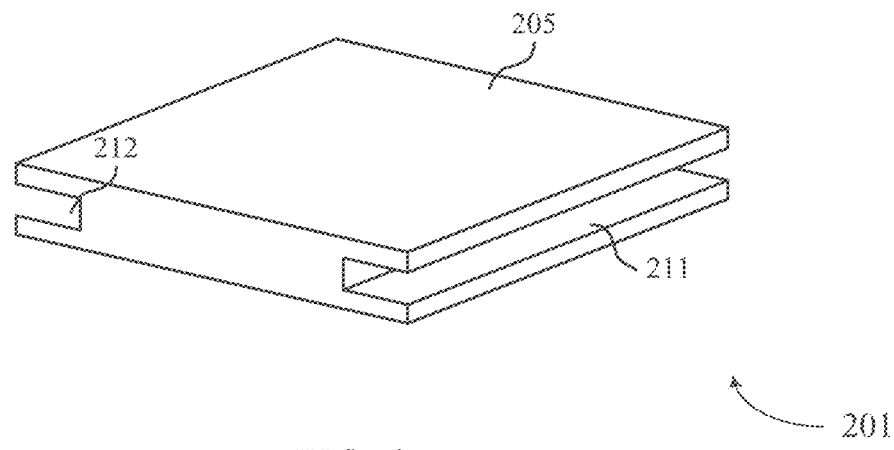
FIGS. 2A, and 2B illustrate an example extruded plate with a saw cut in the first and second ends, in accordance with aspects of the present disclosure.
Figure 2B:
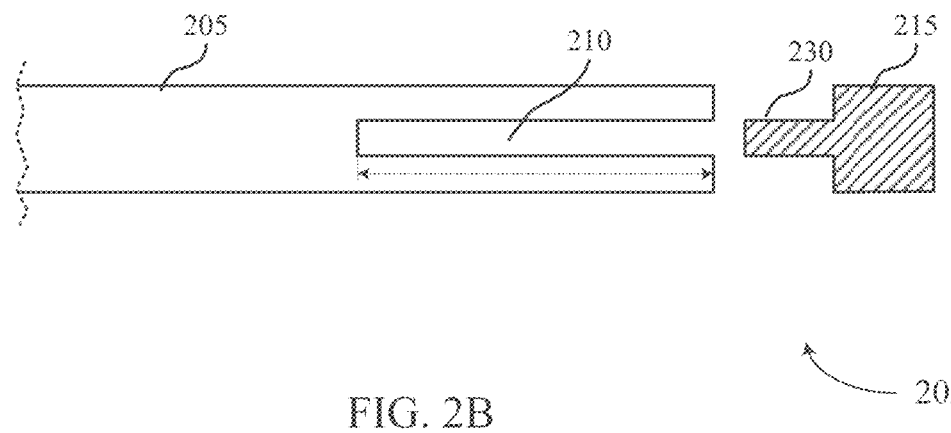
Figure 2C:
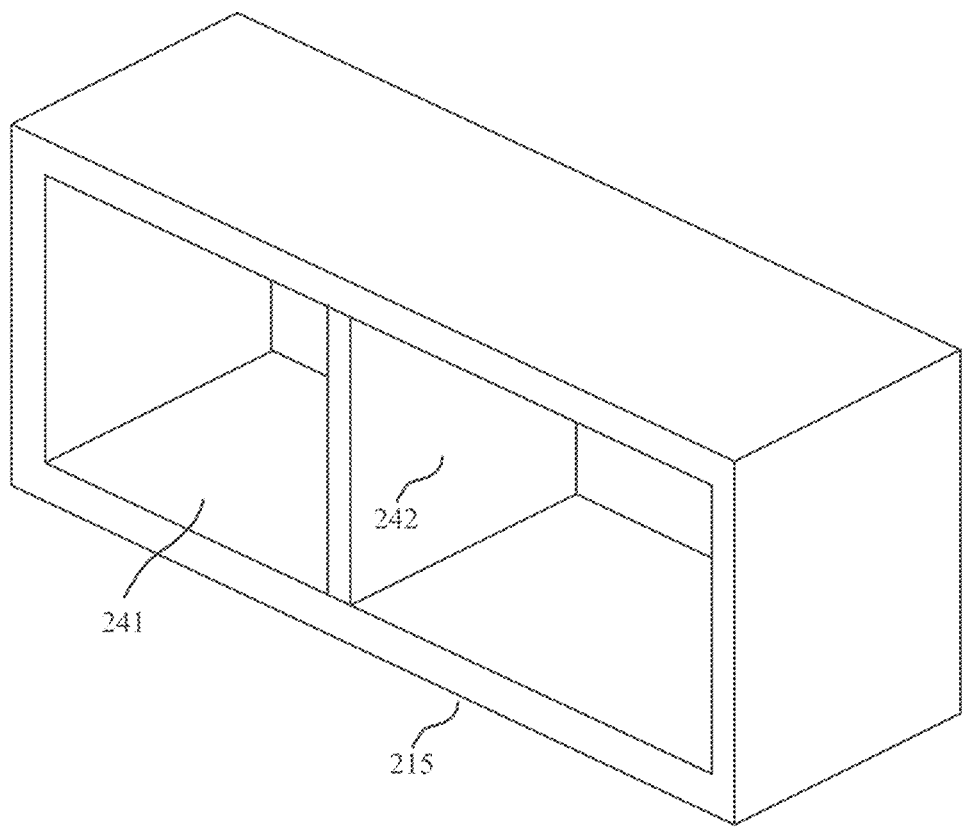
FIGS. 2C and 2D illustrate example end caps for an extruded plate, in accordance with aspects of the present disclosure.
Figure 2D:
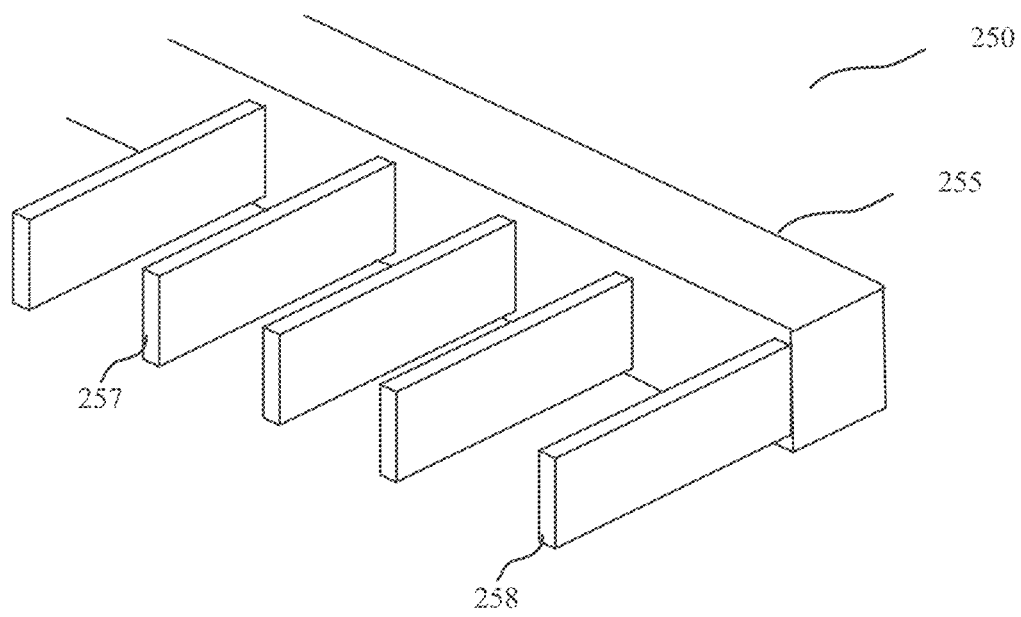

With reference now to FIGS. 2A and 2B, an extruded plate 205 is illustrated with saw cuts in accordance with aspects of the present disclosure. Extruded plate 205 may incorporate aspects of extruded plate 105, 305, 405, 505, and 605 as described with reference to FIGS. 1, 3, 4, 5, and 6. A manifold may be milled out of extruded plate 205 and may incorporate aspects of manifold 310, 410, and 510 as described with reference to FIGS. 3, 4, and 5. In an example embodiment, the manifold is integrated with the extruded plate.

In an example embodiment, extruded plate 205 comprises a first manifold 211 formed in the first end of extruded plate 205, and a second manifold 212 formed in the second end of extruded plate 205. In an example embodiment, the manifolds are created by removal of material from the ends of the extruded plate to create a slot or void in the respective ends of extruded plate 205. In various example embodiments, the material is removed by making a saw cut in the ends of the extruded plate or by using a router to remove the material. In some cases, the depth of the saw cut is 24 mm deep by 2.5 mm tall by 370 mm wide. Moreover, any suitable size of saw cut may be used.

In some examples, the cold plate may further include an end cap 215. End cap 215 is configured to cap off the manifold. End cap 215 may incorporate aspects of end cap 525 and 615 as described with reference to FIGS. 5 and 6. In some cases, a first endcap and a second endcap each comprise a flow directing structure 230 that is inserted into the first manifold 211 and second manifold 212 respectively to direct flow of the working fluid. In some cases, the flow directing structure causes the working fluid from the first port to flow in a first channel and in a second channel that is adjacent to the first channel, linearly, in parallel, in the same direction, from the first end to the second end of the plate.

In one example, the first endcap and the second endcap are configured to create a single manifold on each end such that the fluid flows in the inlet on a first end of the blade, flows through the cold plate blade in parallel channels, and flow out the outlet located at a second end of the cold plate blade, opposite the first end.

In another example embodiment, the flow directing structure could comprise teeth that subdivide the first manifold 211 and/or second manifold 212 to direct the flow into and/or out of particular channels.

In one example embodiment, where the inlet and outlet of the working fluid are in the first manifold, the flow directing structure can separate the first manifold 211 into two halves such that the working fluid flows in an inlet port on one side of the separation wall of the flow directing structure, flows down half of the channels to the second manifold 212, flows back down the other half of the channels back to the second half of the first manifold 211, and out the outlet port on the second half of the first manifold 211.

In another example embodiment, the flow directing structure can have teeth configured to direct the flow down and back every other channel or groups of channels. In this example embodiment, the flow may enter at one end of a first side and flow down and back across the cold plate blade in a serpentine manner. In this example embodiment, the fluid may exit on the first side near the opposite end of the blade, or it may exit on a second side opposite the first side near the opposite end of the blade. In any event, in this example embodiment, the fluid flow is at a relatively constant velocity throughout the cold plate blade, with the exception of when it makes a U turn as it changes direction from one parallel pathway to the next.

In another example embodiment, the flow directing structure can comprise a split level manifold configured with teeth to direct the flow from a top manifold portion down a first channel (or group of channels), and back on an adjacent channel (or group of channels) and into a bottom manifold portion. Thus, in an example embodiment, the flow may enter at one end of a first side and flow down and back across the cold plate blade, but without passing back and forth more than once, so as to minimize the thermal gradient. The split level manifold header creates additional flow routing degrees of freedom.

In yet another example embodiment, a center manifold may be located between a first extruded plate and a second extruded plate. The center manifold may be inserted into the saw cuts on the respective first and second extruded plates and may be configured to direct the flow received from both plates. For example, the center manifold may cause flow from the first extruded plate to return to another channel(s) of the first extruded plate and flow from the second extruded plate to return to another channel(s) of the second extruded plate.

In another example embodiment, flow directing structure 230 causes the working fluid to flow through the extruded plate from an inlet port to an outlet port. In some cases, flow directing structure 230 causes the working fluid from the first port to flow in a first channel from the first end to the second end of the plate, and then back from the second end to the first end in an adjacent channel in a serpentine manner.

In some cases, extruded plate 205 comprises a flow path, where the flow path is one of: linear, serpentine, cross flow, parallel and in series. In some cases, the flow path is dependent on the structure of the first and second end caps. In some cases, extruded plate 205 comprises a serpentine flow path created by the end caps. In accordance with various example embodiments, the channel configuration can be changed by changing the end cap design(s).

In one example embodiment, departing somewhat different from the flow directing structure 230 described before, and with reference to FIG. 2C, the manifold can be formed in the end cap 215. For example, end cap 215 may comprise a structure having one or more cavities 241. In an embodiment where there is a single cavity 241, the end cap 215 comprises a single hollowed out manifold, with no separation wall. In an embodiment where there are 2 cavities, there is a single separation wall 242 between the first and second cavities. Moreover, any suitable number of cavities N can be formed using N−1 separation walls. The end cap 215 may be formed by removing material from a solid structure, e.g. with a router or saw. In other example embodiments, the endcap can be formed by additive manufacturing or any other suitable method. In this example, the end cap 215 is then connected to a non-sawcut extruded plate. In another example embodiment, the hollowed out manifold sections are formed in the ends of the extruded plate and a flat plate (for example) can be used to cap off the manifolds thus formed.

Moreover, in another example embodiment where the manifold is in the ends of the extruded plate, returning to the flow directing structure 230 described before, and with reference to FIG. 2D, end cap 215 may comprise a base component 255, fingers 257, and side walls 258. This embodiment may be "T" shaped for insertion in the manifold. The side walls 258 may be located on either end of endcap 250 and may be configured to close off the ends of the manifold. The fingers 257 may be configured to extend from the base component 255 for insertion into the manifold. The fingers 257 may be further configured to direct flow of the fluid and subdivide the manifold. Thus, in an example embodiment, the flow path of the fluid in the cold plate blade can be modified by reconfiguring the design of the fingers on endcap 250. For example, fingers can be added to further subdivide the manifold, fingers can be removed to cause more parallel flow, and fingers can be placed in different locations, changing the flow in the cold plate blade without redesign of the blade. This facilitates an agile design without change of manufacturing processes for the main body of the cold plate blade.

In some cases, extruded plate 205 is designed to maximize the flow under the cells.

In an example embodiment, any suitable manifold structure may be used that directs the flow from an inlet, through channels in the cold plate (as they've been described herein) to an outlet.

Figure 3:
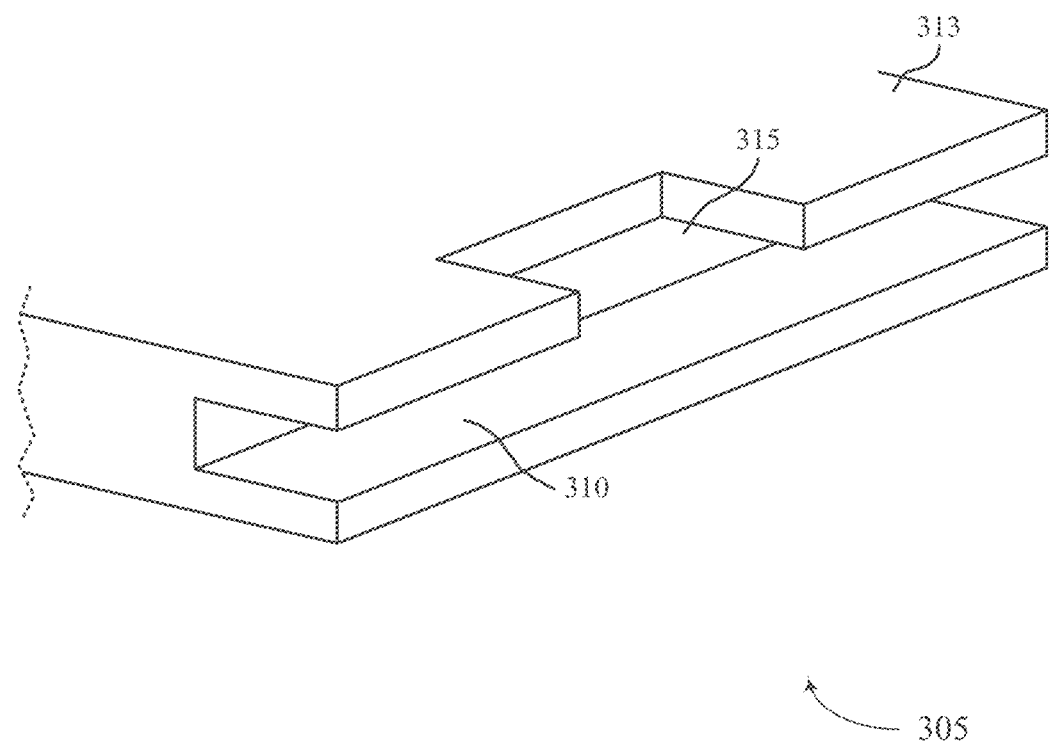
FIG. 3 illustrates an example extruded plate with a notch cut out of the cold plate in accordance with aspects of the present disclosure.

FIG. 3 illustrates extruded plate 305 with a notch 315 cut out of one of the top and bottom sides of extruded plate 305, the top side 313 in this case, in accordance with aspects of the present disclosure. Thus, in an example embodiment, extruded plate 305 may include manifold 310 and notch 315. Extruded plate 305 may incorporate aspects of extruded plate 105, 205, 405, 505, and 605 as described with reference to FIGS. 1, 2, 4, 5, and 6. Notch 315 may be milled from extruded plate 305 and may incorporate aspects of notch 415 and 515 as described with reference to FIGS. 4 and 5.

In particular, notch 315 may be formed by any suitable method including router or laser removal of a portion of the top side or bottom side of the extruded plate 305. The notch 315 is any suitable size for receiving a port as described below. The notch is configured to provide an opening to manifold 310. In the embodiment where the manifold is located in the endcap, the notch may also be in the endcap.

Figure 4:
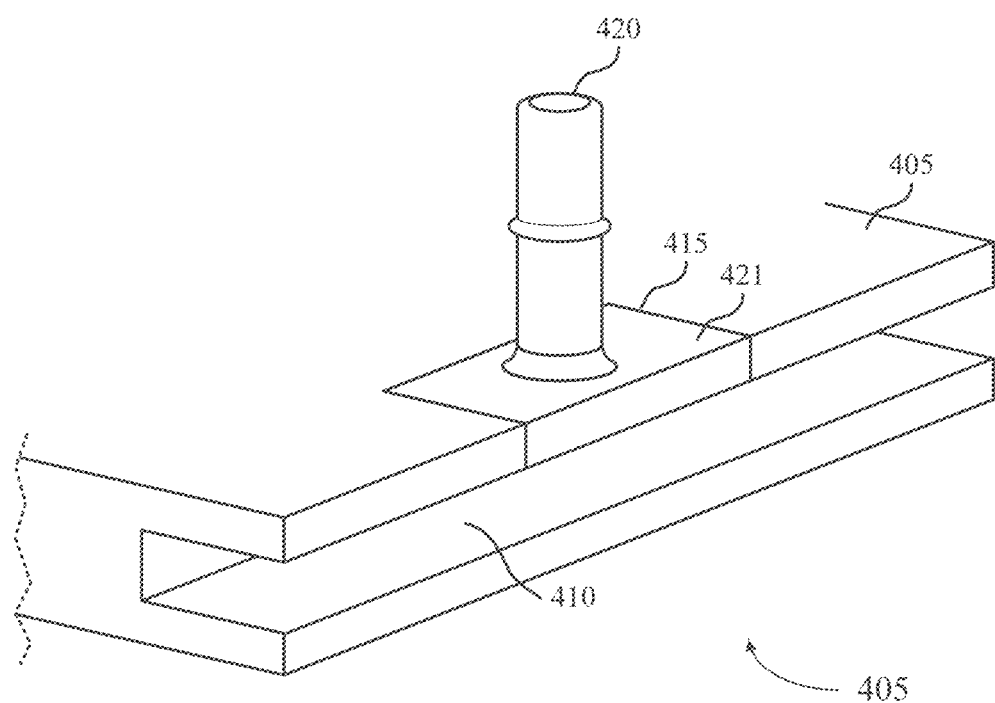
FIG. 4 illustrates an example extruded plate with a port positioned in the notch in accordance with aspects of the present disclosure.

FIG. 4 illustrates an extruded plate 405 with a port 420, in accordance with aspects of the present disclosure. In some examples, extruded plate 405 may include manifold 410, notch 415, and port 420. Extruded plate 405 may incorporate aspects of extruded plate 105, 205, 305, 505, and 605 as described with reference to FIGS. 1, 2, 3, 5, and 6.

In an example embodiment, port 420 may comprise a flange 421. In an example embodiment, flange 421 is configured to fit in notch 415. In an example embodiment, the first port 420 comprises a flange 421 for mating with the first notch 415. In an example embodiment, port 420 is attached to extruded plate 405 by friction welding flange 421 to extruded plate 405. Moreover, any suitable method of creating a port into the manifolds may be used.

Port 420 may incorporate aspects of port 520 and 620 as described with reference to FIGS. 5 and 6. In an example embodiment, a first port 420 is an injection port. In example embodiments, the first port 420 is an inlet port. In an example embodiment, the first port 420 comprises an inlet fitting.

In other example embodiments, not shown in FIG. 4, the extruded plate 405 further comprises a second port with a second flange for mating in a second notch in extruded plate 405. In an example embodiment, the second port is an outlet port for out flow of the working fluid. The second port may be located at the same manifold as the first port, or it may be located at the opposite manifold from the first port. Moreover, the second port can be located on the same side of the extruded plate 405 as the first port or on the opposite side of the extruded plate 405. Thus, in an example embodiment, the first port is configured for inlet of a working fluid to the first manifold and the second port is configured for outlet of the working fluid from one of the first manifold or the second manifold. In some cases, the first port 420 and a second port (not shown in this figure) are each an integrated connection port integrated in the extruded plate.

Figure 5:
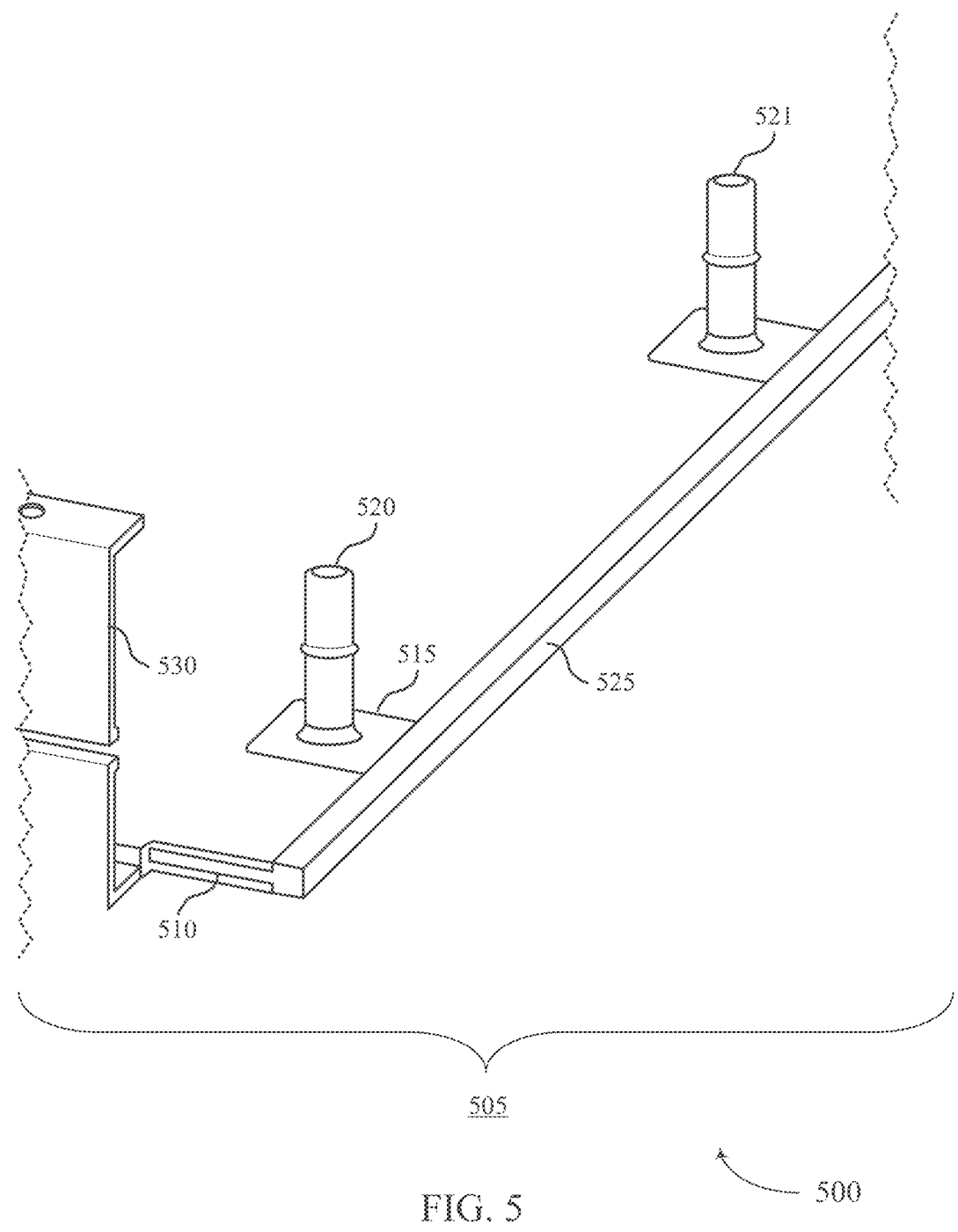
FIG. 5 illustrates an example cold plate, comprising an example extruded plate with an end cap in accordance with aspects of the present disclosure.

FIG. 5 illustrates a cold plate 500 comprising an extruded plate 505 with an end cap 525, in accordance with aspects of the present disclosure. In some examples, cold plate 500 comprises extruded plate 505, manifold 510, notch 515, ports 520 and 521, and end cap 525. Moreover, as illustrated in FIG. 5, cold plate 500 may further comprise a side rail 530. Extruded plate 505 may incorporate aspects of extruded plate 105, 205, 305, 405, and 605 as described with reference to FIGS. 1, 2, 3, 4, and 6.

Manifold 510 may incorporate aspects of manifold 210, 310, and 410 as described with reference to FIGS. 2, 3, and 4. Notch 515 may incorporate aspects of notch 315 and 415 as described with reference to FIGS. 3 and 4. Port 520 may incorporate aspects of port 420 and 620 as described with reference to FIGS. 4 and 6. End cap 525 may incorporate aspects of end cap 215 and 615 as described with reference to FIGS. 2 and 6.

Side rail 530 may incorporate aspects of side rail 630 as described with reference to FIG. 6. In some cases, side rail 530 comprises a mounting interface or a flange. In various example embodiments, side rail 530 is formed by extrusion, stamping, and the like. In some cases, side rail 530 is friction welded to a side edge of cold plate 500. Thus, in some cases, the cold plate 500 further comprises a mounting interface to mount the cold plate 500 to other objects. In some cases, the other objects comprise one of: a battery pack, and a vehicle structure. Thus, in an example embodiment, side rail 530 may be called a mounting side rail.

Figure 6:
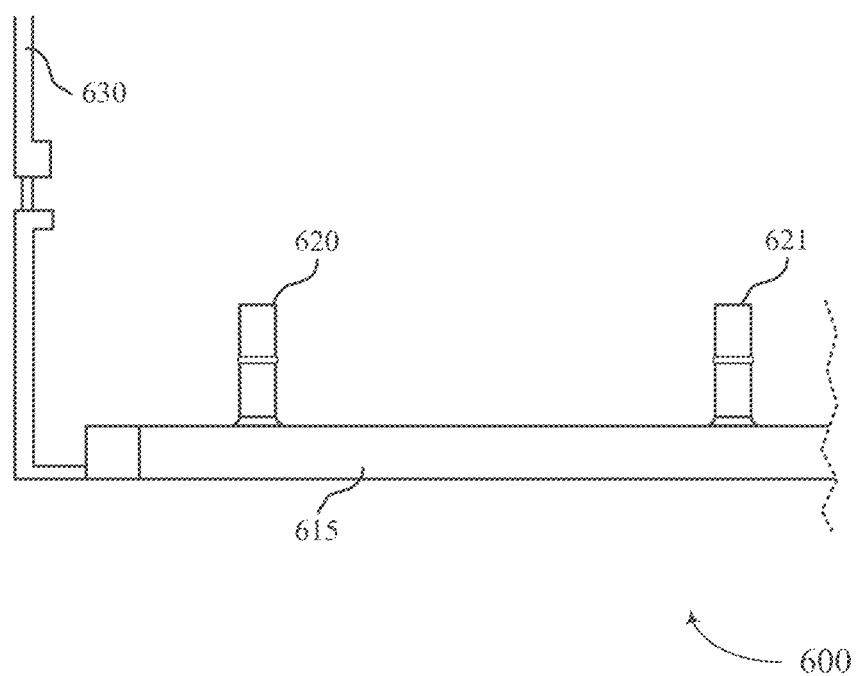
FIG. 6 illustrates an end view of an example cold plate with a side rail in accordance with aspects of the present disclosure.

FIG. 6 illustrates an end view of a cold plate 600 with a side rail 630 in accordance with aspects of the present disclosure. In some examples, cold plate 600 may include ports 620 and 621, end cap 615, and side rail 630.

Port 620 may incorporate aspects of port 420 and 520 as described with reference to FIGS. 4 and 5. End cap 615 may incorporate aspects of end cap 215 and 525 as described with reference to FIGS. 2 and 5. Side rail 630 may incorporate aspects of side rail 530 as described with reference to FIG. 5.

Figure 7:
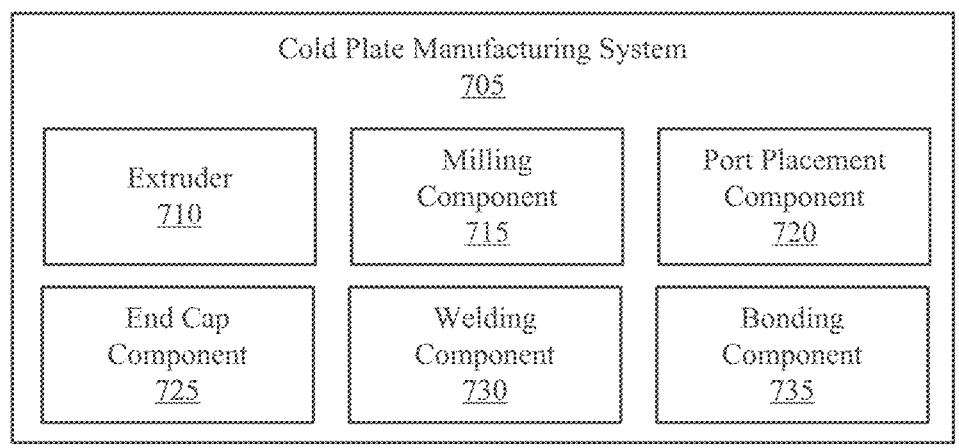
FIG. 7 shows a diagram of a cold plate manufacturing system formed using an extrusion process in accordance with aspects of the present disclosure.

FIG. 7 shows a diagram 700 of a cold plate manufacturing system 705 formed using an extrusion process in accordance with aspects of the present disclosure. In some examples, cold plate manufacturing system 705 may include extruder 710, milling component 715, port placement component 720, end cap component 725, welding component 730, and bonding component 735.

Extruder 710 may extrude a metallic material through a die to form an extruded plate. In various embodiments, a cold plate manufacturing system may replace extruder 710 with die caster or a stamping/forming component.

Milling component 715 may mill the first end of the plate to form a first manifold; mill the second end of the plate to form a second manifold; mill a first notch in the top surface over the first manifold; and mill a second notch in one of the top or bottom surfaces over or under one of the first manifold or the second manifold. In some cases, the milling is performed by saw cutting. In some cases, the milling could be performed by milling "router". In some cases, the depth of the saw cut is 24 mm deep by 2.5 mm tall by 370 mm wide, or any suitable dimension.

Port placement component 720 may place, in the first notch, a first port for inlet of a working fluid to the first manifold and place, in the second notch, a second port for outlet of the working fluid from one of the first manifold or the second manifold.

End cap component 725 may form a first end cap and a second end cap as described herein.

Welding component 730 may weld the extruded plate, the first end cap, the second end cap, the first port and the second port to form a sealed enclosure. In some cases, the welding comprises friction welding. In some cases, the friction welding further comprises sealing the first endcap to the first manifold and the second end cap to the second manifold in a solderless manner and without bonding or adhesive. In some cases, the friction welding further comprises sealing the first endcap to the first manifold and the second end cap to the second manifold in a manner to prevent leaks from occurring even under loads and vibration common in vehicular applications. In some cases, the friction welding results in self-sealing interfaces between the extruded plate, the first and second ports, and the first and second end caps, without subsequent use of a sealant. Although described herein generally as sealing with friction welding techniques, any suitable techniques for joining two objects may be used in other example embodiments. For example, plastic can be friction stirred. Structural bonding, laser welding, and other known techniques for joining to objects can be used as suitable for the particular connection. In various embodiments, when the various components were formed via casting or stamping/forming, welding component 730 may be replaced with a brazing component, not shown.

Bonding component 735 may bond cells directly to the cold plate. In an example embodiment, the direct bonding reduces thermal stack up.

Figure 8:
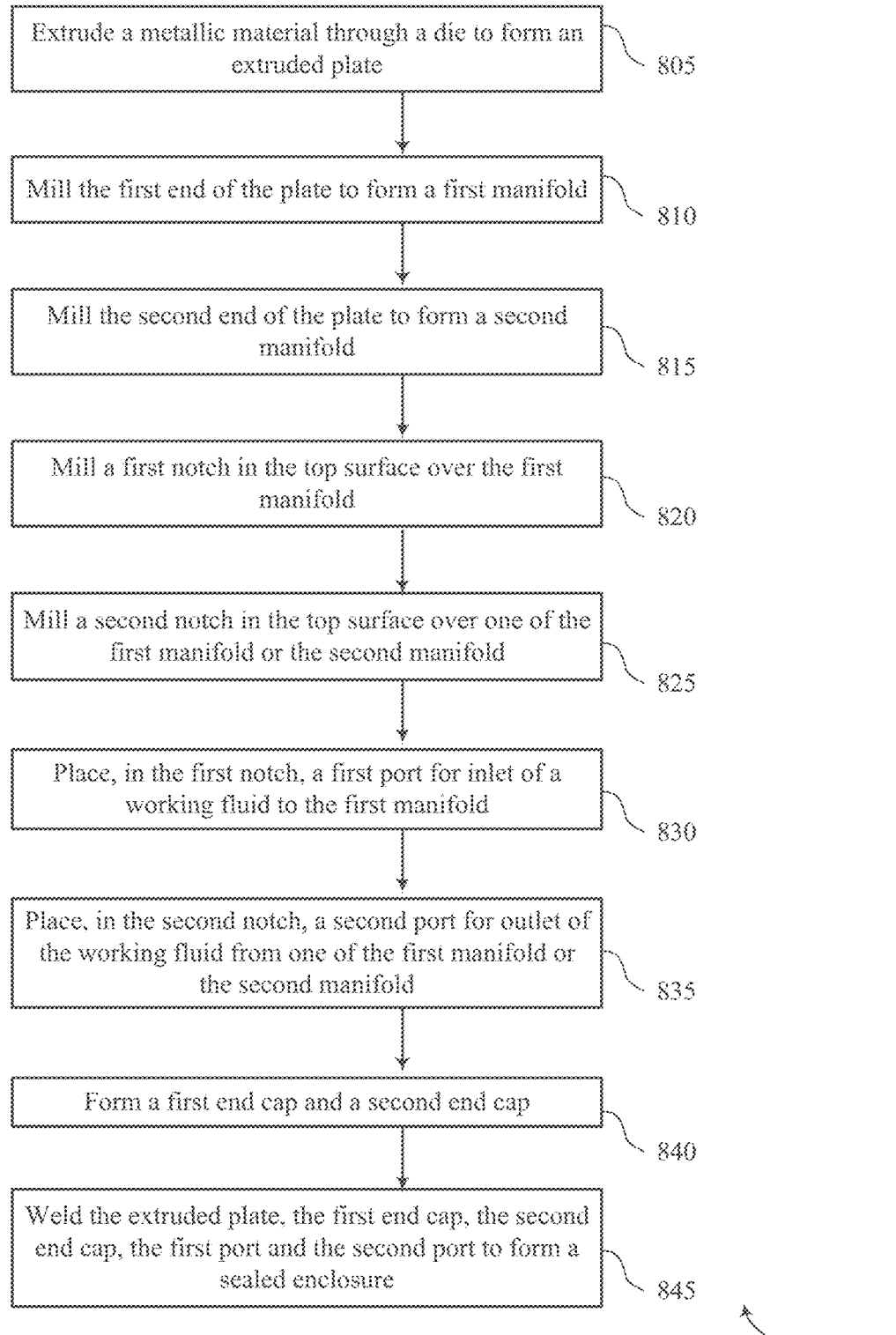
FIG. 8 shows a flowchart of a process for manufacturing a cold plate using an extrusion process in accordance with aspects of the present disclosure.

FIG. 8 shows a flowchart 800 of a process performed by a cold plate manufacturing system 705 for manufacturing a cold plate using an extrusion process in accordance with aspects of the present disclosure. In some examples, a cold plate manufacturing system may execute a set of codes to control functional elements of the cold plate manufacturing system to perform the described functions. Additionally, or alternatively, a cold plate manufacturing system may use special-purpose hardware. In an example embodiment, the operations described herein may be composed of various sub-steps, or may be performed in conjunction with other operations described herein. These operations may be performed according to the methods and processes described in accordance with aspects of the present disclosure.

At block 805 the cold plate manufacturing system may extrude a metallic material through a die to form an extruded plate. In certain examples, aspects of the described operations may be performed by extruder 710 as described with reference to FIG. 7. The extruded plate may comprise channels, formed by the extruding process, that extend from a first end of the plate, linearly, to a second end of the plate opposite the first end of the plate. The plate comprises a top surface and a bottom surface parallel to the top surface. The channels are located in parallel with each other and between the top surface and the bottom surface; and in some cases, the channels are separated from each other by walls formed by the extruding process.

At block 810 the cold plate manufacturing system may mill the first end of the plate to form a first manifold. At block 815 the cold plate manufacturing system may mill the second end of the plate to form a second manifold. In certain examples, aspects of the described operations may be performed by milling component 715 as described with reference to FIG. 7.

At block 820 the cold plate manufacturing system may mill a first notch in the top surface over the first manifold. At block 825 the cold plate manufacturing system may mill a second notch in the top surface over one of the first manifold or the second manifold. In certain examples, aspects of the described operations may be performed by milling component 715 as described with reference to FIG. 7.

At block 830 the cold plate manufacturing system may place, in the first notch, a first port for inlet of a working fluid to the first manifold. At block 835 the cold plate manufacturing system may place, in the second notch, a second port for outlet of the working fluid from one of the first manifold or the second manifold. In certain examples, aspects of the described operations may be performed by port placement component 720 as described with reference to FIG. 7.

At block 840 the cold plate manufacturing system may form a first end cap and a second end cap. In certain examples, aspects of the described operations may be performed by end cap component 725 as described with reference to FIG. 7.

At block 845 the cold plate manufacturing system may weld the extruded plate, the first end cap, the second end cap, the first port and the second port to form a sealed enclosure. In certain examples, aspects of the described operations may be performed by welding component 730 as described with reference to FIG. 7.

Figure 10A:
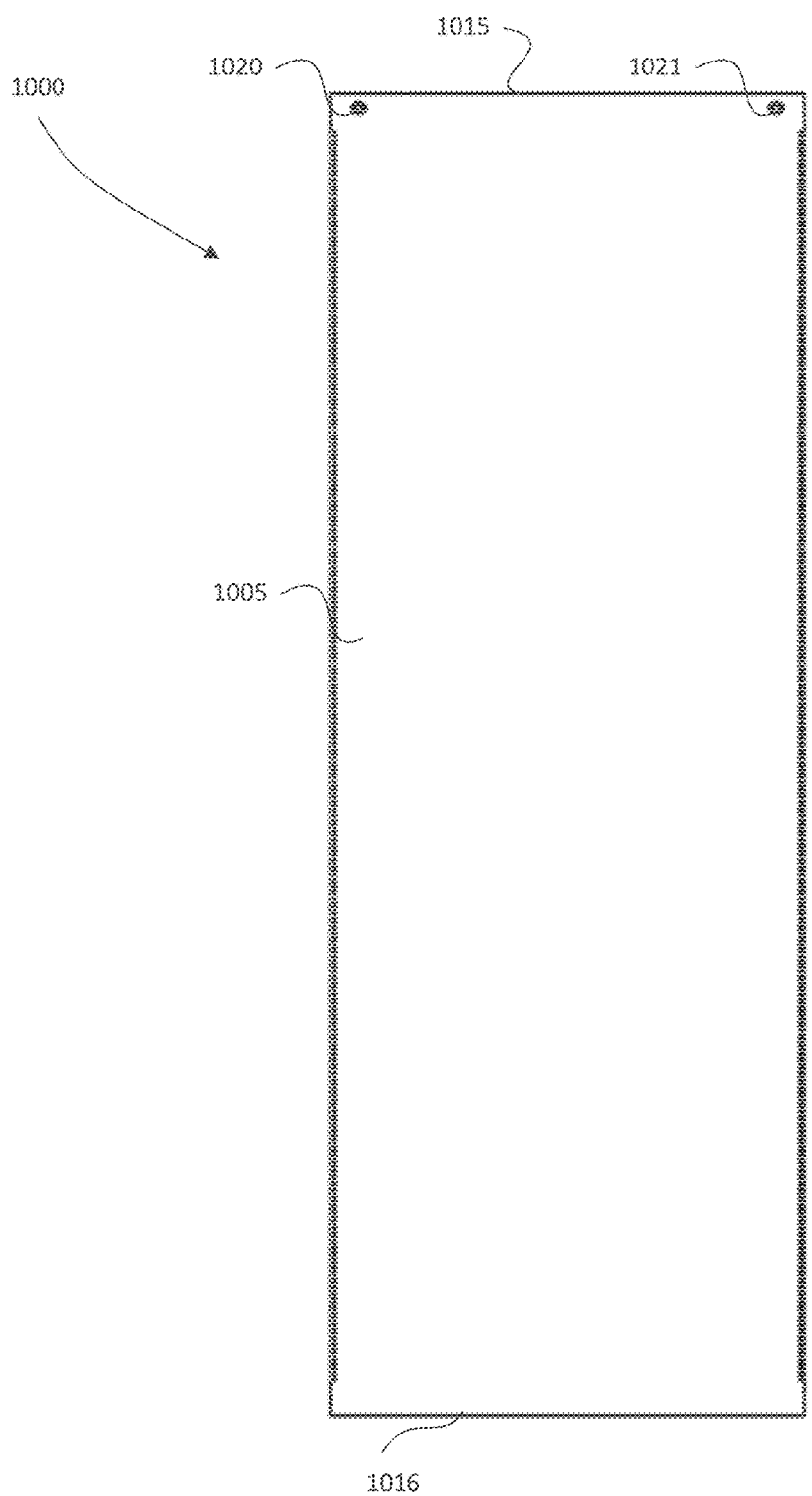
FIG. 10A illustrates a top view of an example cold plate in accordance with aspects of the present disclosure.

FIG. 10A illustrates a top view of a cold plate 1000 with an inlet port 1020 and an outlet port 1021 in accordance with aspects of the present disclosure. Cold plate 1000 may further comprise an extruded plate 1005, a first end cap 1015 disposed proximate the end having the inlet port 1020 and the outlet port 1021, and a second end cap 1016 disposed opposite the first end cap.

Figure 10B:
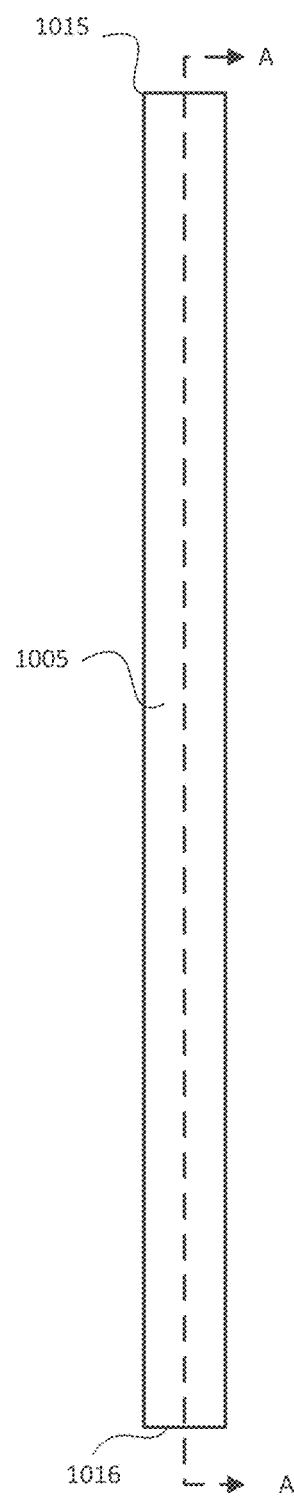
FIG. 10B illustrates a side view of an example cold plate in accordance with aspects of the present disclosure.
Figure 10C:
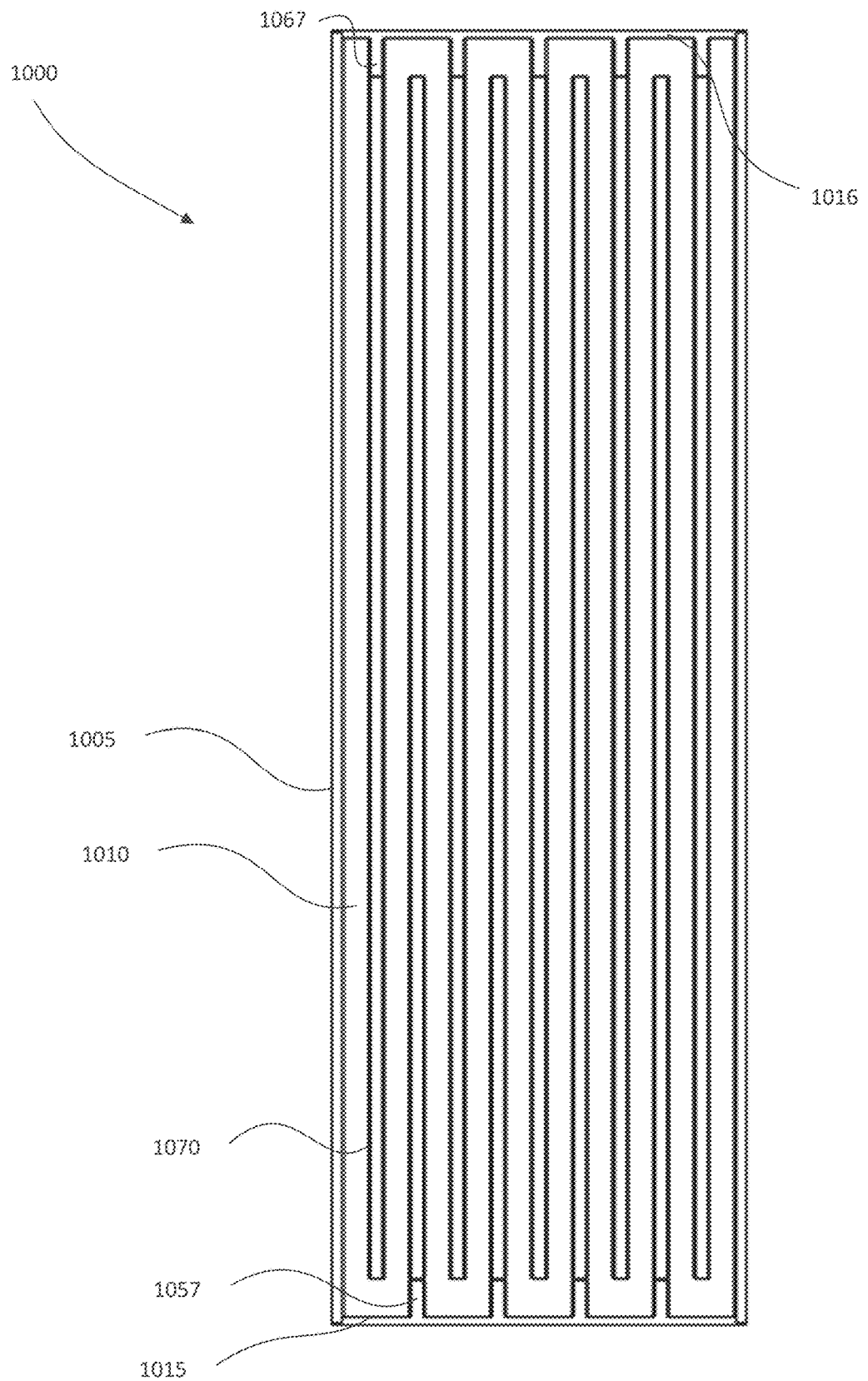
FIG. 10C illustrates a cross-sectional view of an example cold plate in accordance with aspects of the present disclosure.

FIG. 10B illustrates a side view of cold plate 1000 including the extruded plate 1005, the first end cap 1015, and the second end cap 1016 in accordance with aspects of the present disclosure. FIG. 10C illustrates a cross-sectional view along section A-A of cold plate 1000. First end cap 1015 may further comprise fingers 1057 configured to interface with every other wall 1070 on a first end of the cold plate 1000. Similarly, second end cap 1016 may comprise fingers 1067 configured to interface with each wall that first end cap 1015 does not interface with. This may create a serpentine flow path where the working fluid enters the inlet port 1020 and flows through channels 1010 from a first end of the cold plate 1000 to the second end of the cold plate 1000 and then back from the second end of the cold plate 1000 to the first end of the cold plate 1000. This may be repeated several times and the outlet port 1021 may be on the same side as the inlet port 1020, as shown in FIG. 10A.

Figure 11A:
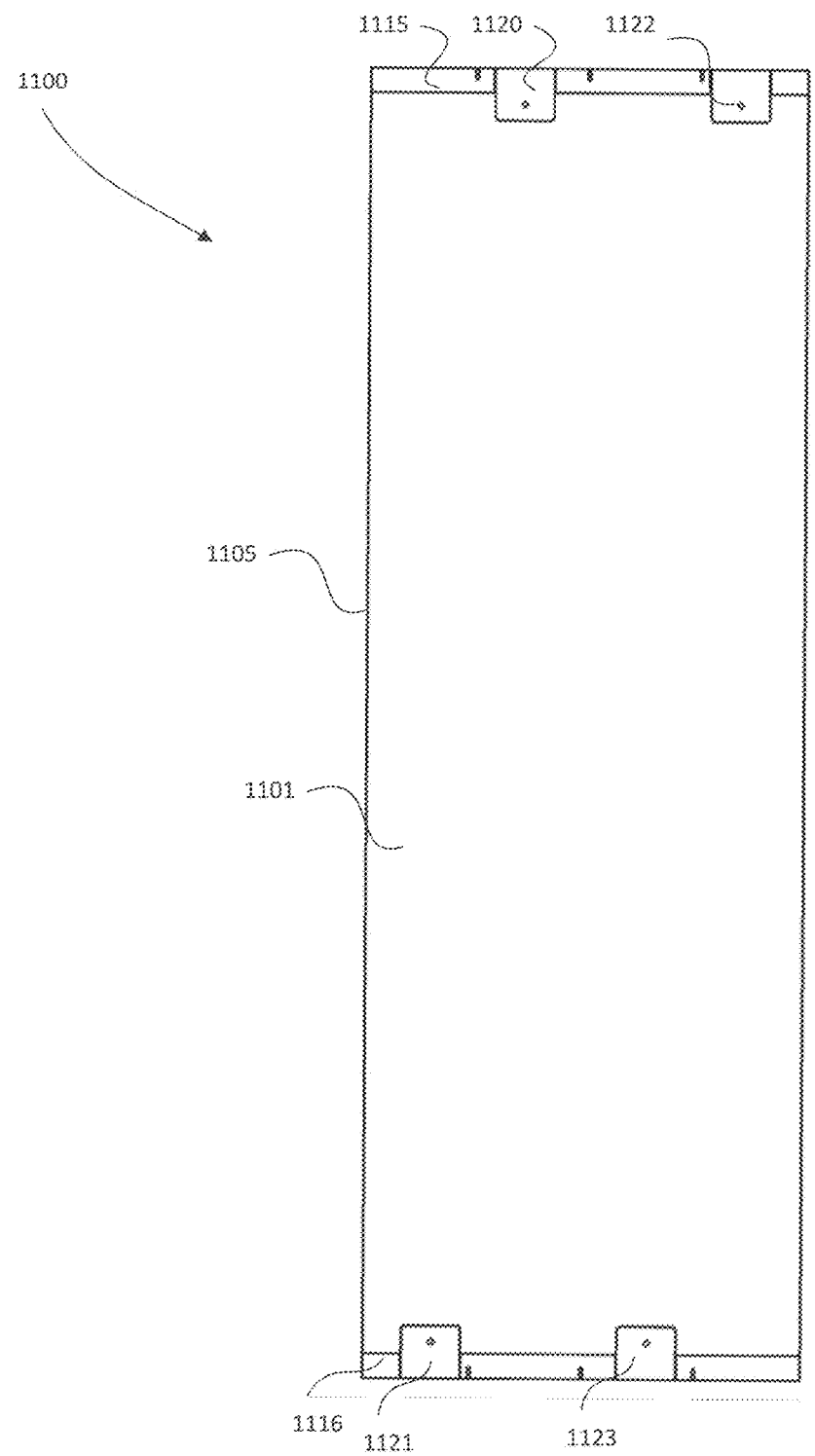
FIG. 11A illustrates a top view of an example cold plate in accordance with aspects of the present disclosure.

FIG. 11A illustrates a top view of a cold plate 1100 with a first inlet port 1120, a first outlet port 1121, a second inlet port 1122, and a second outlet port 1123 in accordance with aspects of the present disclosure. Cold plate 1100 may further comprise an extruded plate 1105, a first end cap 1115 disposed proximate the end having the first inlet port 1120 and the second inlet port 1122, and a second end cap 1116 disposed opposite the first end cap. In various embodiments, an inlet port may be an outlet port and vice versa resulting in a first inlet port on one end and a second inlet port on the opposite end. In an exemplary embodiment, the lengthwise orientation of the inlet ports (1120, 1122) and the outlet ports (1121, 1123) may be parallel to the flow path within the cold plate 1100. This configuration may allow the fluid connections to be made externally to the system and allow the fluid connections to be sealed away from where the battery cells are located. This may have the added benefit of creating a safer system in case of crash, penetration, or crash shock loads. Additionally, this may decrease the likelihood that fluid connections are damaged from manufacturing error, maintenance, or the like.

Figure 11B:
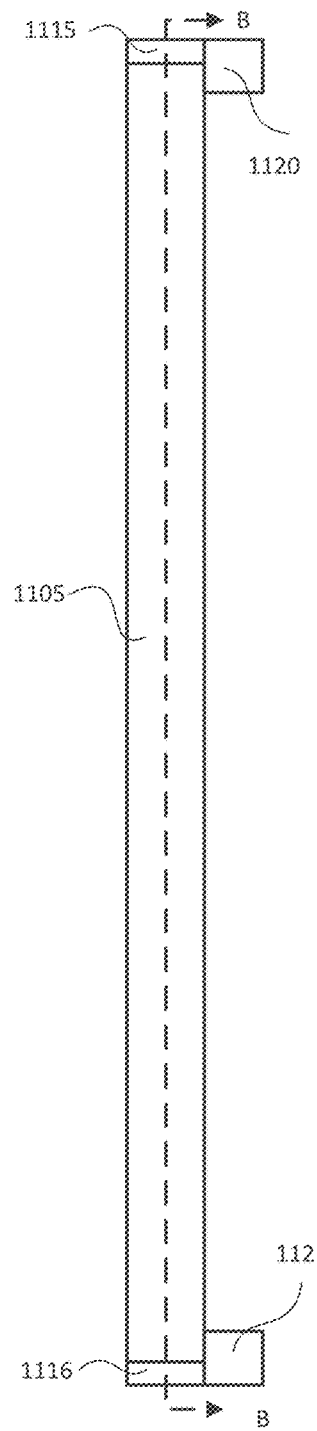
FIG. 11B illustrates a side view of an example cold plate in accordance with aspects of the present disclosure.
Figure 11C:
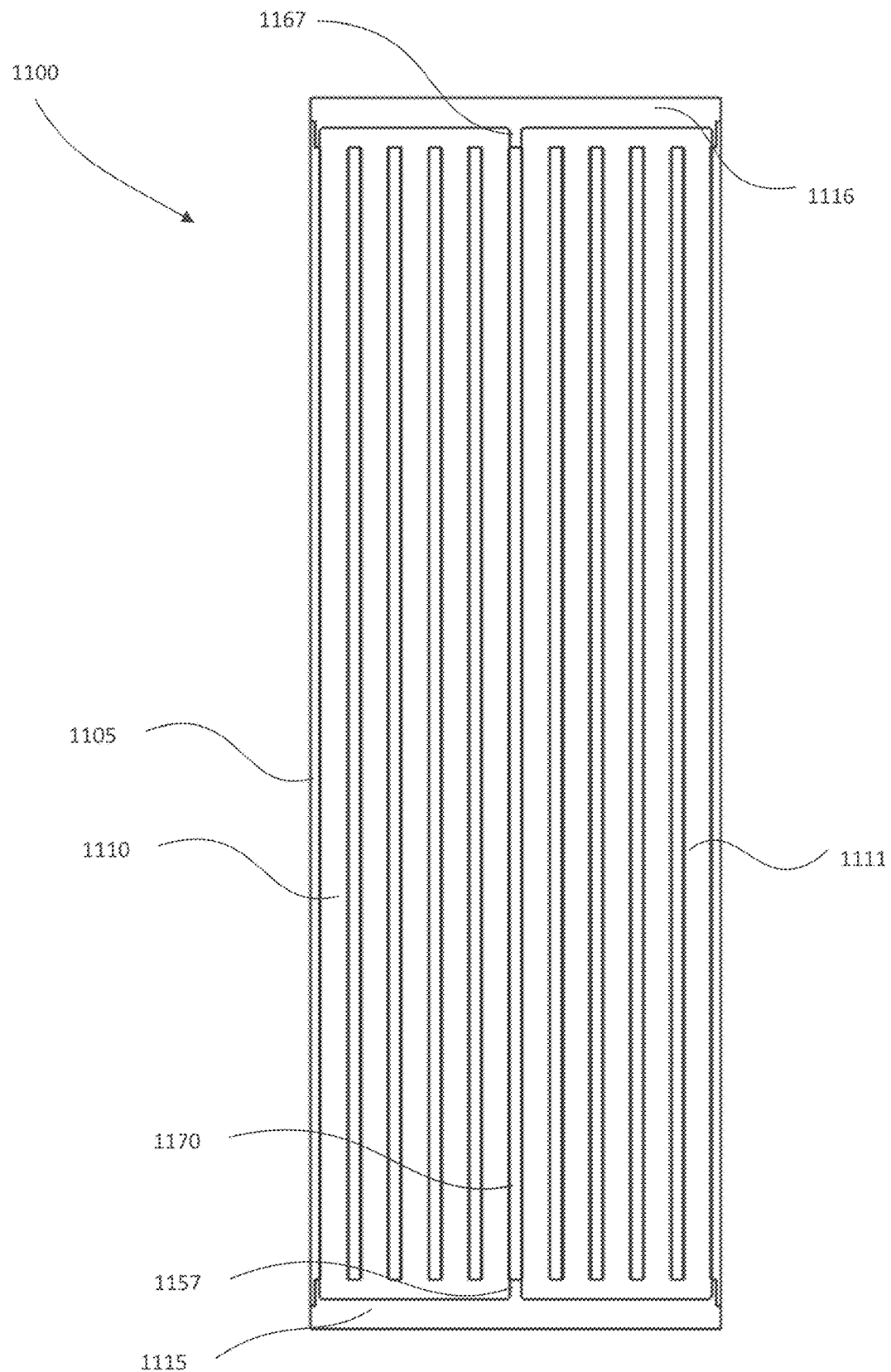
FIG. 11C illustrates a cross-sectional view of an example cold plate in accordance with aspects of the present disclosure.

FIG. 11B illustrates a side view of cold plate 1100 including the extruded plate 1105, the first end cap 1115, and the second end cap 1116 in accordance with aspects of the present disclosure. FIG. 11C illustrates a cross-sectional view along section B-B of cold plate 1100. First end cap 1115 may further comprise a finger 1157 configured to interface with a middle wall 1170 on a first end of the cold plate 1100. Similarly, second end cap 1116 may comprise a finger 1167 configured to interface with the middle wall 1170 on the second end. This configuration may create a pass through flow path on a first half of the extruded plate 1105 and on the second half of the extruded plate. The working fluid may enter the first inlet port 1120 and flow through channels 1110 from a first end to the second end on the first half of the cold plate 1100 and out the first outlet port 1121. Similarly, the working fluid may enter the second inlet port 1122 and flow through channels 1111 from a first end to the second end on the second half of the cold plate 1100 and out the second outlet port 1123. This may ensure two separate and distinct flow paths on each half of cold plate 1100.

Figure 12A:
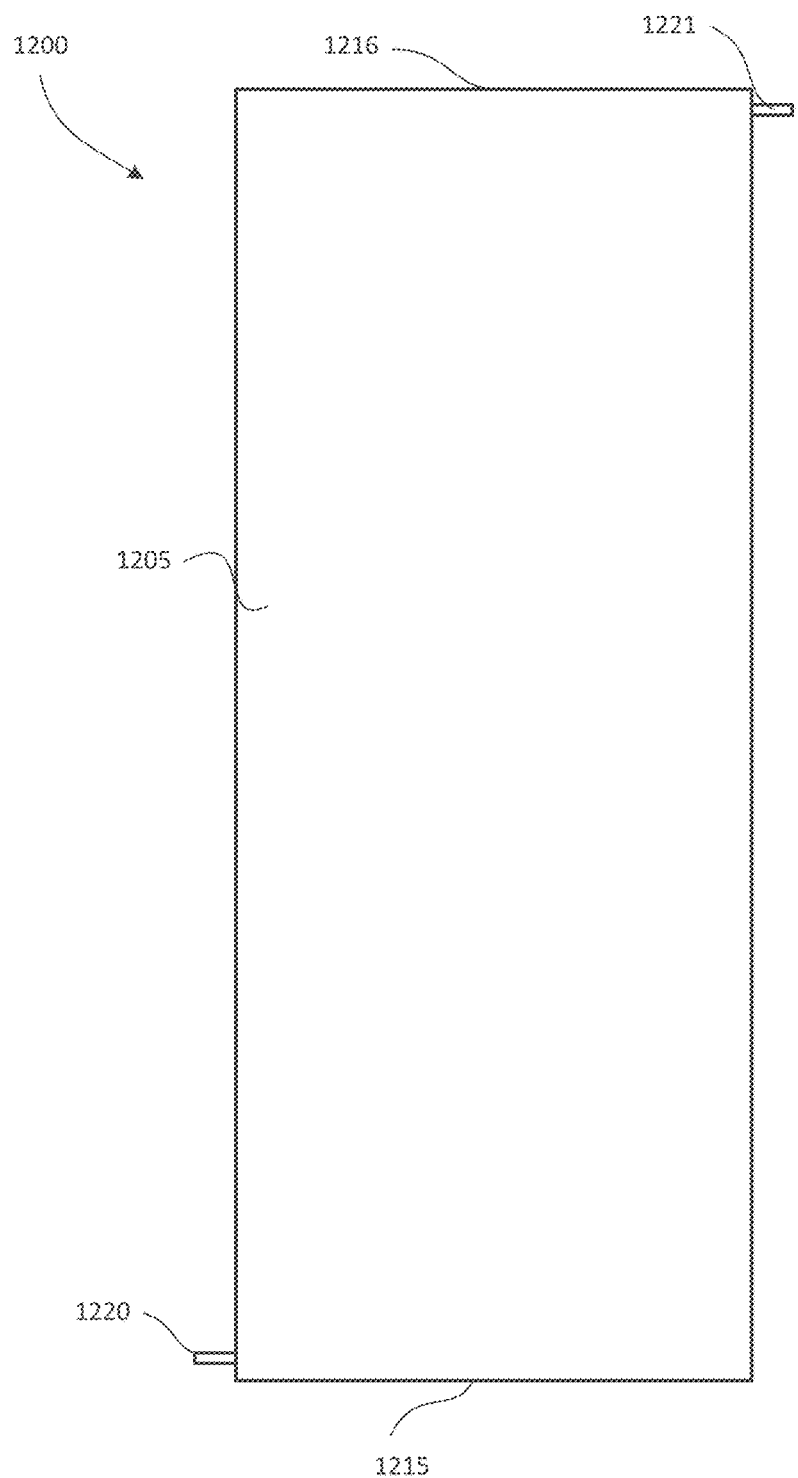
FIG. 12A illustrates a top view of an example cold plate in accordance with aspects of the present disclosure.

FIG. 12A illustrates a top view of a cold plate 1200 with an inlet port 1220 and an outlet port 1221 in accordance with aspects of the present disclosure. Cold plate 1200 may further comprise an extruded plate 1205, a first end cap 1215 disposed proximate the end having the inlet port 1220, and a second end cap 1216 disposed opposite the first end cap 1215 proximate to the outlet port 1221. The inlet port 1220 may be disposed on a first side of extruded plate 1205 proximate the first end cap 1215, and the outlet port 1221 may be disposed on a second side of extruded plate 1205 proximate the second end cap 1216. This configuration is beneficial with respect to pressure drop, for example, because the fluid flows across the width of the cold plate, rather than across the length of the cold plate (the width being a shorter distance than the length). Thus, by placing the fluid ports (1220, 1221) on opposite sides of the cold plate 1200 and then flowing the fluid in the direction across the plate from one side to the other, a lower pressure drop is created. Moreover, the "inline" input/output ports reduce the pressure drop that would occur from all of the fluid making 90 degree turns at the ports.

Figure 12B:
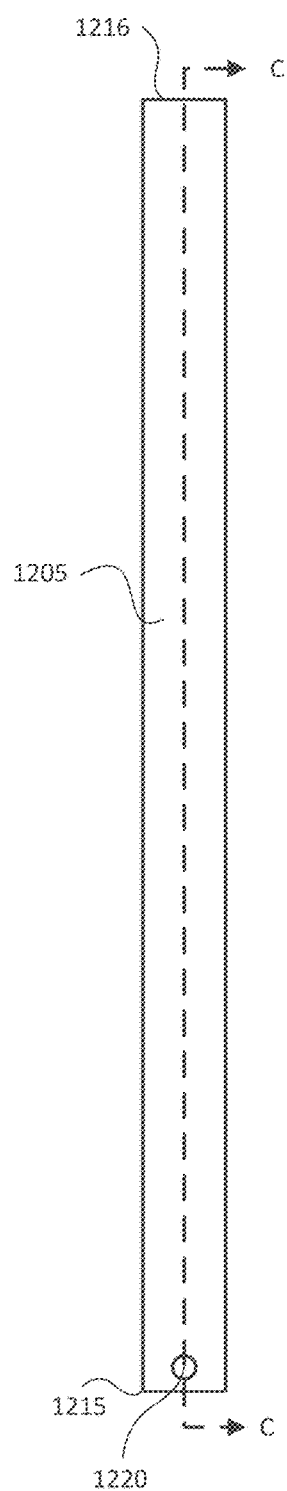
FIG. 12B illustrates a side view of an example cold plate in accordance with aspects of the present disclosure.
Figure 12C:
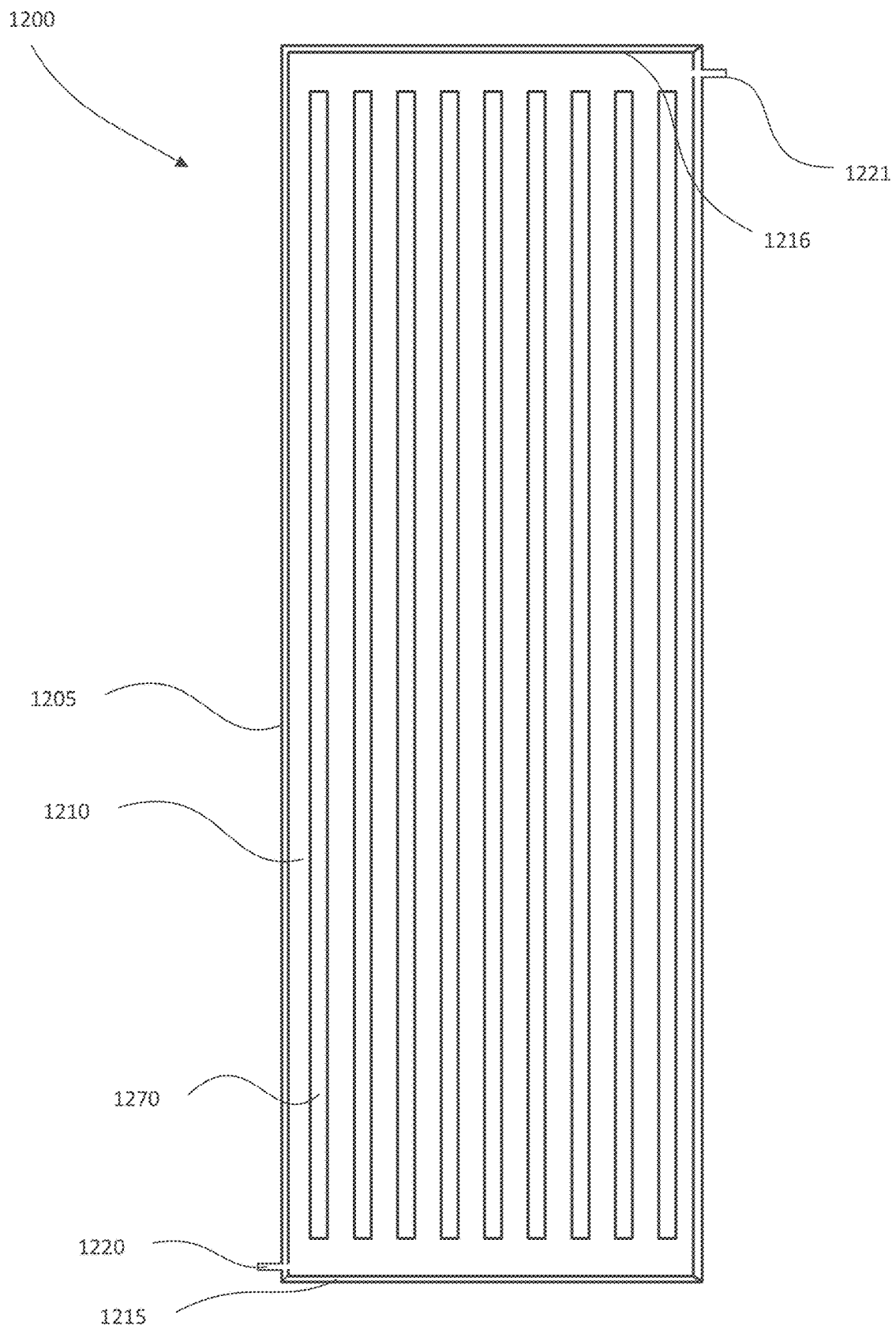
FIG. 12C illustrates a cross-sectional view of an example cold plate in accordance with aspects of the present disclosure.

FIG. 12B illustrates a side view of cold plate 1200 including the extruded plate 1205, the first end cap 1215, the second end cap 1216, and the inlet port 1220 in accordance with aspects of the present disclosure. FIG. 12C illustrates a cross-sectional view along section C-C of cold plate 1200. This configuration may create a pass through flow path on the extruded plate 1205. The working fluid may enter the inlet port 1220 and flow through channels 1210 from a first end to the second end of cold plate 1200 and out the outlet port 1221.

Figure 13A:
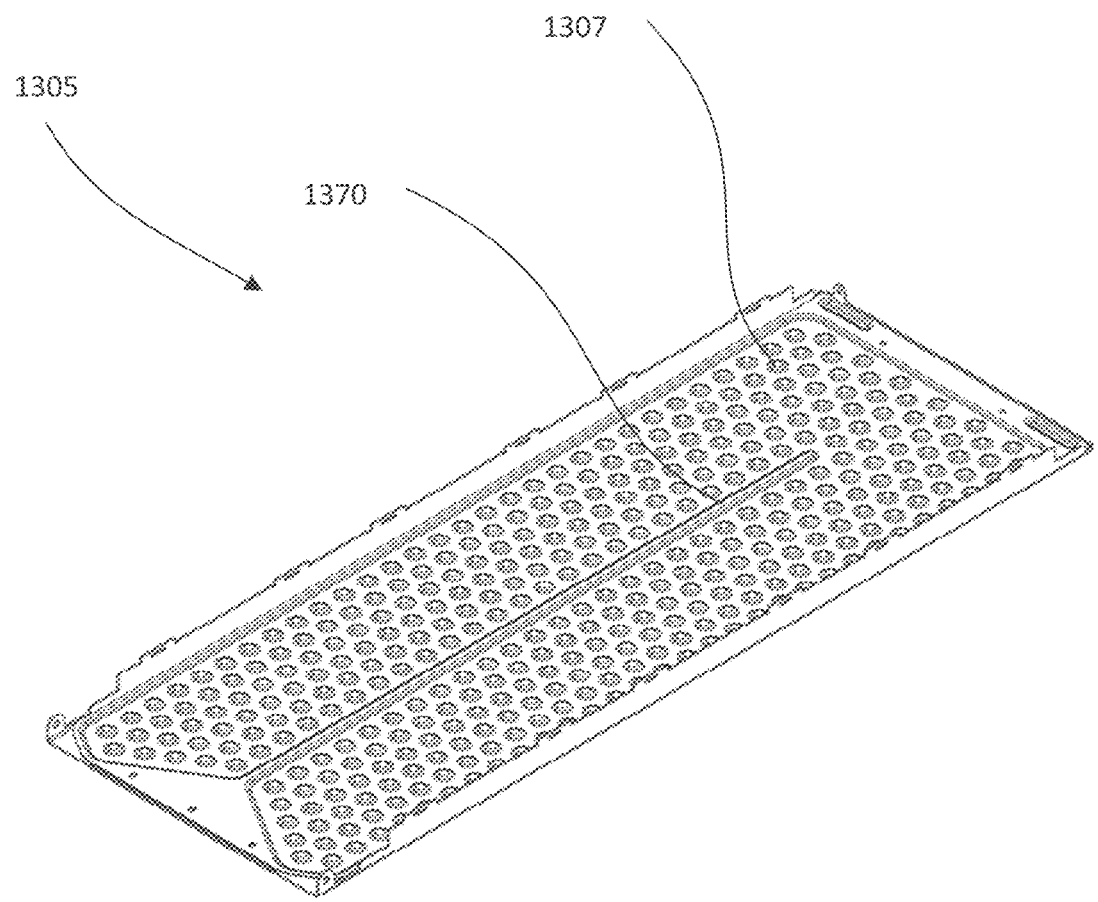
FIG. 13A illustrates a perspective view of an example stamped plate in accordance with aspects of the present disclosure.

FIG. 13A illustrates a perspective view of a stamped plate 1305 in accordance with aspects of the present disclosure. The stamped plate 1305 may comprise a plurality of perturbances 1307, which may be designed to increase the cooling of provided by the stamped plate 1305 to a battery. The stamped plate 1305 may be configured to be assembled with another extruded plate and form a cold plate. The stamped plate 1305 may further comprise a first wall 1370 configured to mate with a flat surface of an interfacing extruded plate and create a serpentine flow path.

Figure 13B:
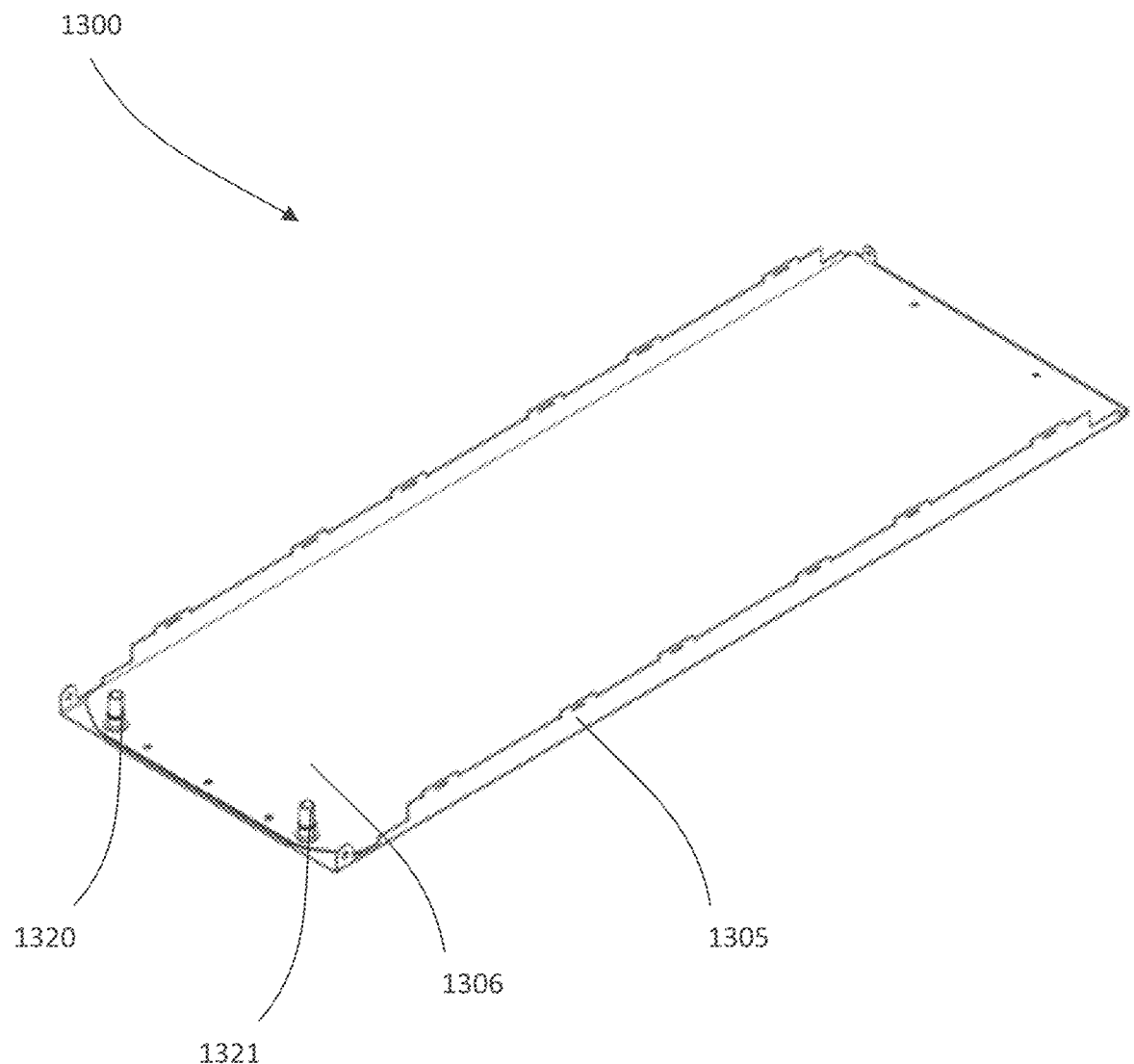
FIG. 13B illustrates a perspective view of an example cold plate in accordance with aspects of the present disclosure.

FIG. 13B illustrates a perspective view of a cold plate assembly 1300 in accordance with aspects of the present disclosure. The cold plate assembly 1300 may comprise a first stamped plate 1305 and a second plate 1306 coupled to the first stamped plate 1305. The cold plate assembly 1300 may further comprise an inlet port 1320 and an outlet port 1321. In an example embodiment, the stamped plate 1305 may comprise stamped sheet metal. In an example embodiment, the first stamped plate 1305 and the second plate 1306 may be coupled via brazing. This configuration may provide the same, or similar structural benefit as the extruded and welded embodiments.

Figure 14A:
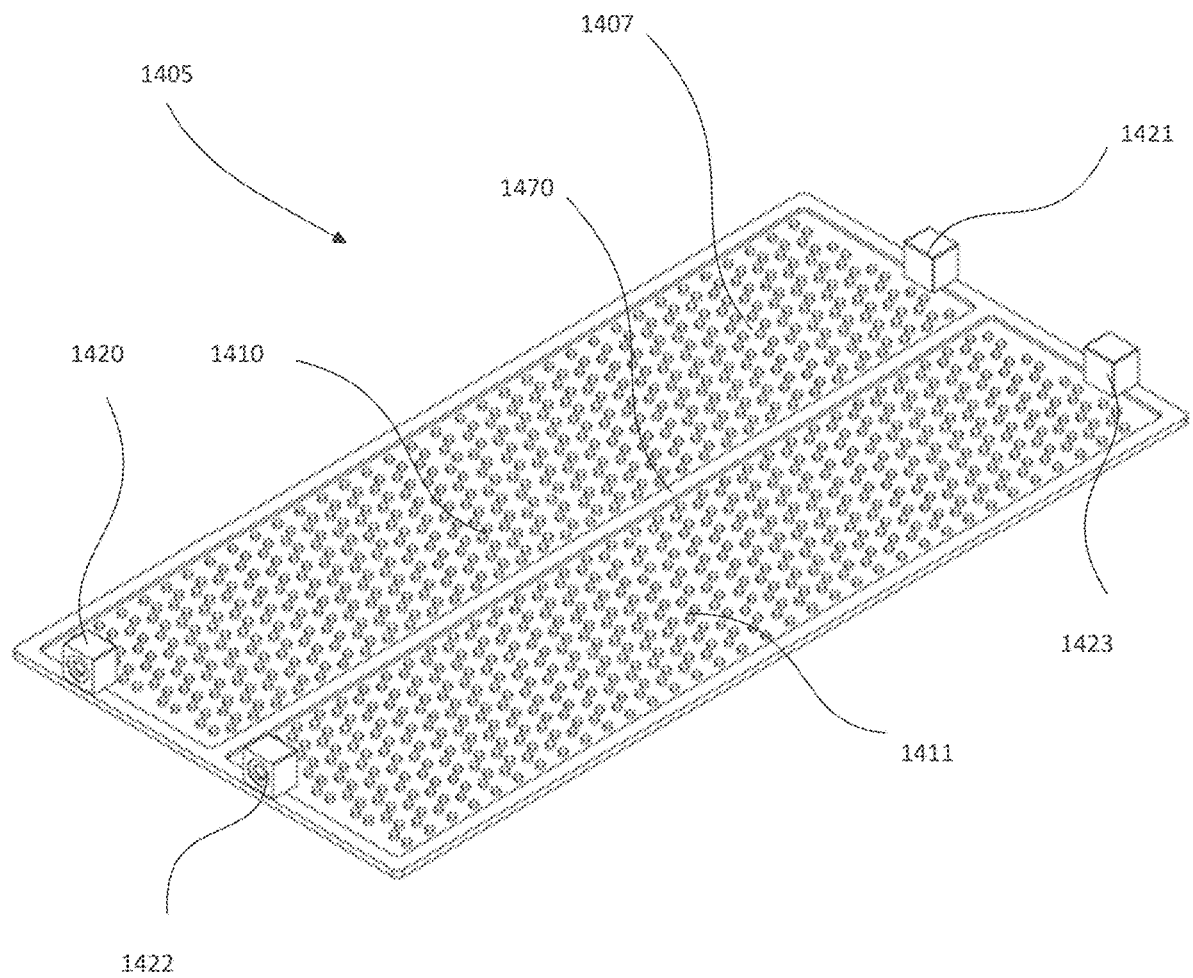
FIG. 14A illustrates a perspective view of an example cast plate in accordance with aspects of the present disclosure.

FIG. 14A illustrates a perspective view of a casted plate 1405 in accordance with aspects of the present disclosure. The casted plate 1405 may comprise a plurality of perturbances 1407, which may be designed to increase the cooling of provided by the casted plate 1405 to a battery. The casted plate 1405 may be configured to be assembled with another extruded plate and form a cold plate assembly. The casted plate 1405 may further comprise a wall 1470 configured to mate with flat sheet metal surface of an interfacing plate and create a two separate flow paths. The sheet metal may provide a highly thermally conductive material for battery cell(s) to interface with. The casted plate 1405 may provide the majority of the structural support for a battery module, and the casted plate 1405 may be thermally insulating in nature. In an example embodiment, the first inlet port 1420, the first outlet port 1421, the second inlet port 1422, and the second outlet port 1423 may be welded or brazed to the casted plate 1405. In an example embodiment, a working fluid may flow through first inlet port 1420 through a first channel 1410 to the first outlet port 1421. Similarly, a working fluid may flow through second inlet port 1422 through a second channel 1411 to the second outlet port 1423. In an example embodiment, the casted plate 1405 may be manufactured via casting.

Figure 14B:
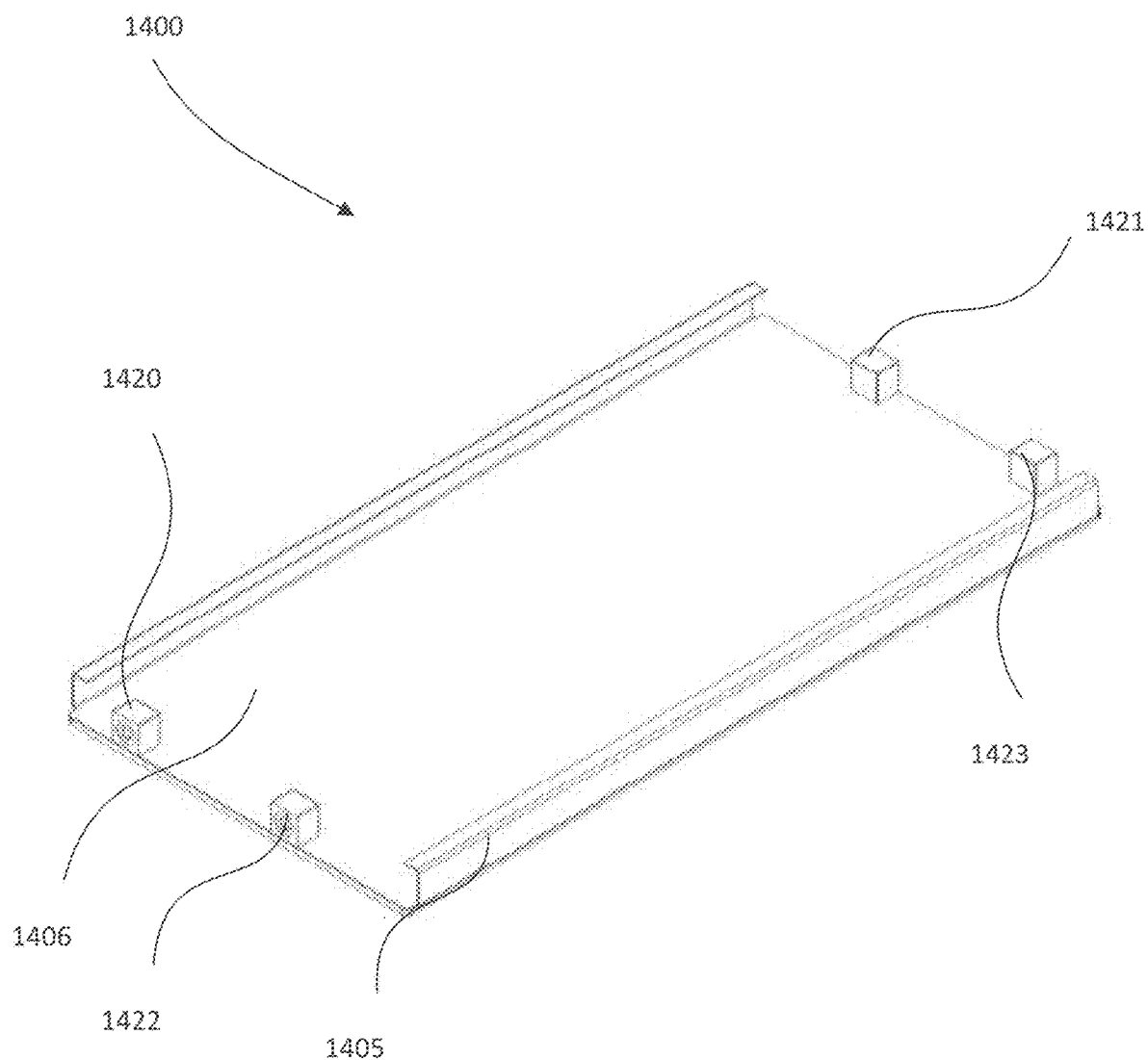
FIG. 14B illustrates a perspective view of an example cold plate in accordance with aspects of the present disclosure.

FIG. 14B illustrates a perspective view of a cold plate assembly 1400 in accordance with aspects of the present disclosure. The cold plate assembly 1400 may comprise a first casted plate 1405, a second plate 1406 coupled to the first casted plate 1405, a first inlet port 1420 coupled to a first end of the first casted plate 1405, a first outlet port 1421 coupled to a second end of the first casted plate 1405, a second inlet port 1422 coupled to the first end of the first casted plate 1405 and a second outlet port 1423 coupled to the second end of the first casted plate 1405. The ports (1420, 1421, 1422, 1423) may be coupled to the first casted plate 1405 by brazing or welding. In an example embodiment, the orientation of the inlet ports (1420,1422) and outlet ports (1421,1423) may be parallel to channels (1410, 1411) and may create a 90 degree turn for the working fluid to enter channels (1410, 1411).

Figure 15A:
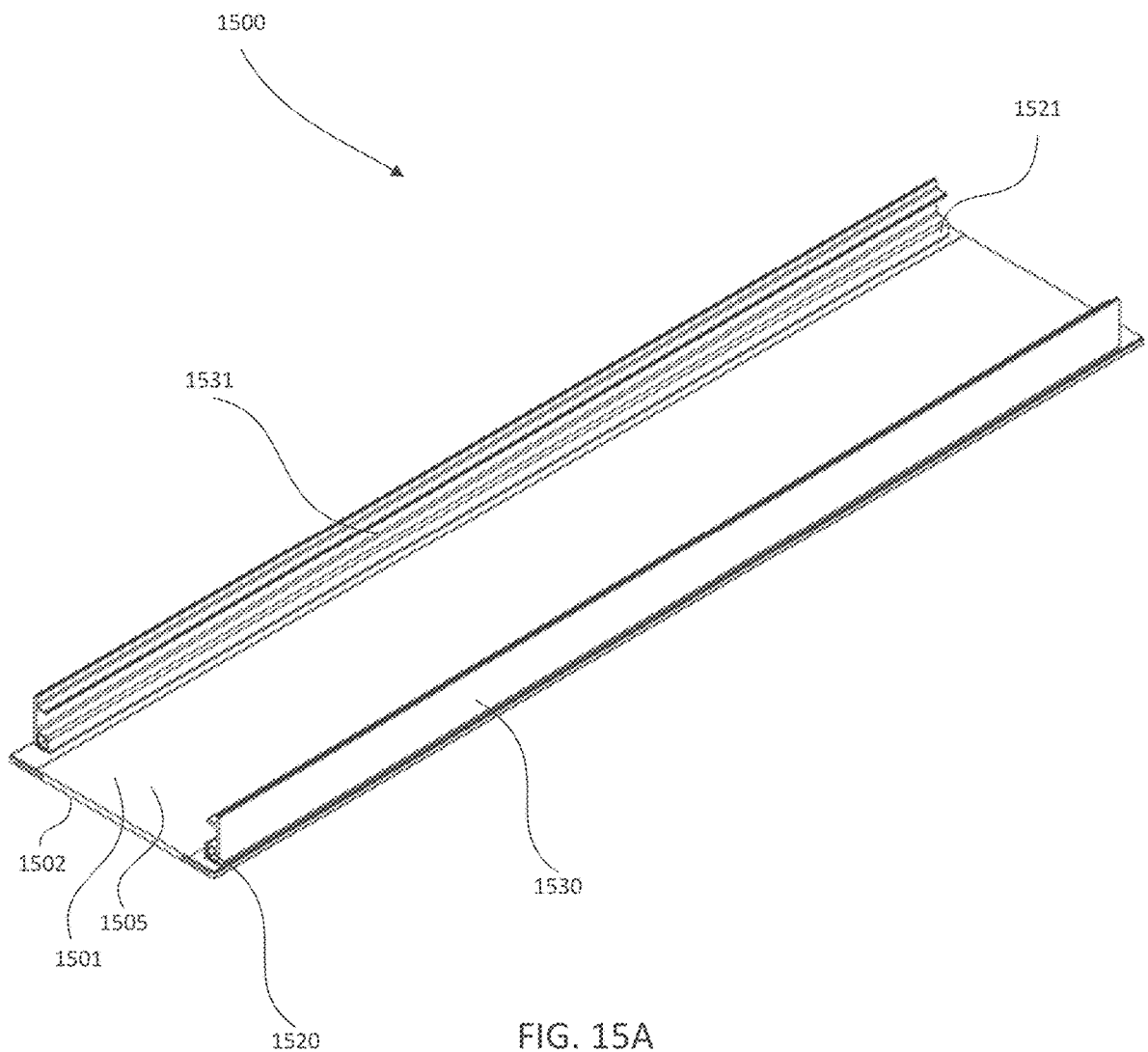
FIG. 15A illustrates a perspective view of an example cold plate in accordance with aspects of the present disclosure.

FIG. 15A illustrates a perspective view of a cold plate assembly 1500 in accordance with aspects of the present disclosure. The cold plate assembly 1500 may comprise an extruded plate 1505, a first side rail 1530 coupled to the first extruded plate on a first side, and a second side rail 1531 disposed opposite the first side rail 1530 and coupled to the extruded plate 1505. The first side rail 1530 may comprise an inlet port 1520, and the second side rail 1531 may comprise an outlet port 1521. In addition to supplying the working fluid, first side rail 1530 and second side rail 1531 may provide structural support for a battery assembly.

Figure 15B:
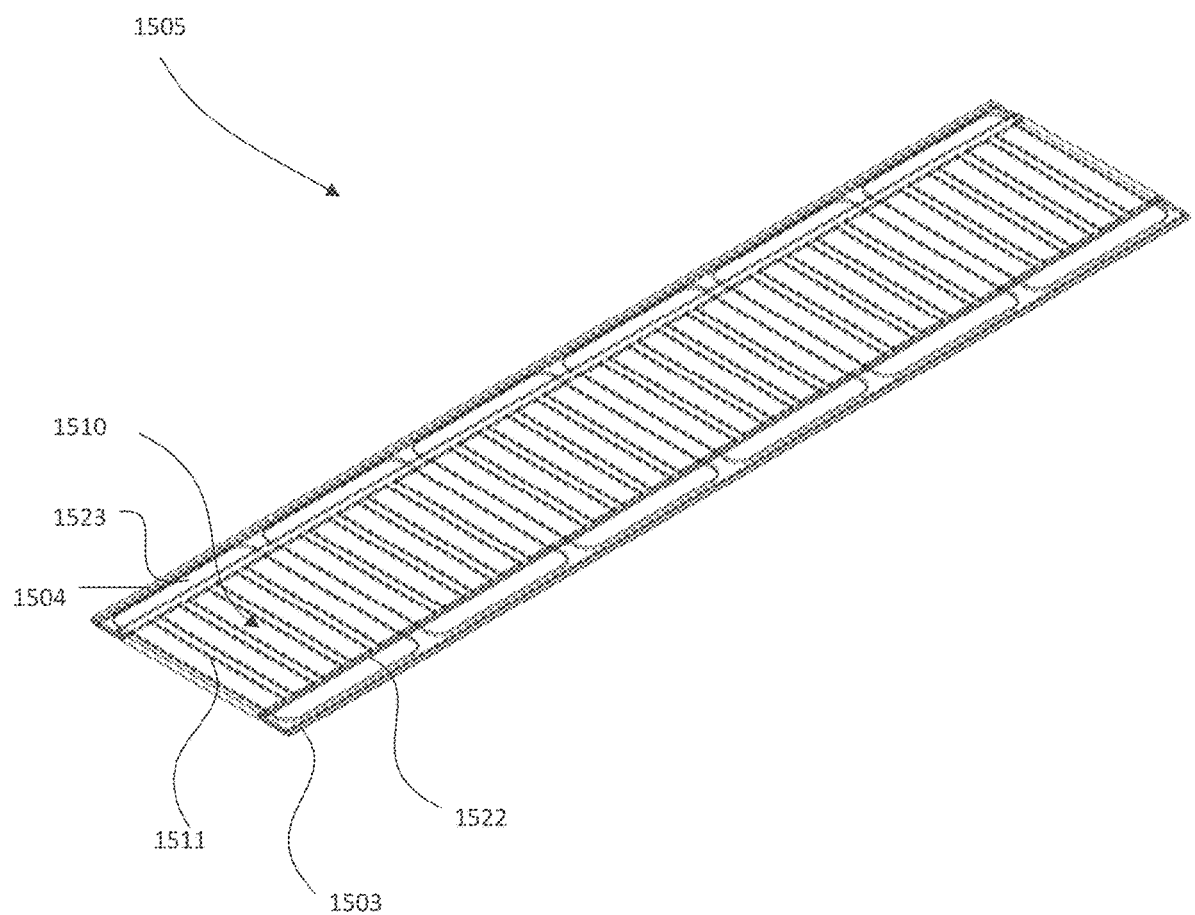
FIG. 15B illustrates a perspective cross-sectional view of an example extruded plate in accordance with aspects of the present disclosure.

FIG. 15B illustrates a cross section in the plane between the top surface 1501 and bottom surface 1502 of the extruded plate 1505. In an example embodiment, the extruded plate 1505 comprises a plurality of manifolds 1510. Each manifold 1510 may comprise a plurality of channels 1511 extending from a first side 1503 of extruded plate 1505 to a second side 1504 of extruded plate 1505.

Each manifold 1510 may further comprise a manifold inlet 1522 in fluid communication with the inlet port 1520 of the first side rail 1530 (FIG. 15A) and a manifold outlet 1523 in fluid communication with the outlet port 1521 of the second side rail 1531 (FIG. 15A). By the working fluid traveling laterally across the cold plate assembly 1500, the fluid may experience a decrease in pressure drop, a greater mass flow rate, and greater cooling capability.

In various embodiments, the extruded plate 1505 may be extruded, stamped/formed, or cast. In various embodiments, the various components may be joined by welding or brazing.

A method for manufacturing a cold plate may comprising forming a plate. The plate may comprise channels that extend from a first end of the plate, linearly, to a second end of the plate opposite the first end of the plate. The plate may comprise a top surface and a bottom surface being co-planar to the top surface. The channels may be located in parallel with each other and between the top surface and the bottom surface. The channels may be separated from each other by walls. The first end of the plate may be milled to form a first manifold. The second end of the plate may be milled to form a second manifold. A first notch may be milled in the top surface over the first manifold, A second notch may be milled in the top surface over one of the first manifold or the second manifold. A first port may be placed in the first notch as an inlet of a working fluid to the first manifold. A second port may be placed in the second notch for an outlet of the working fluid from one of the first manifold or the second manifold. A first end cap and a second end cap may be formed. The first end cap, the second end cap, the first port, and the second port may be sealed to form a sealed enclosure.

In an example embodiment, the cold plate blade has a more even temperature contour throughout the structure. In particular, the cold plate blade is configured to have a nearly uniform temperature contour in an "in-plate" direction perpendicular to the direction of flow of the fluid through the cold plate blade. In contrast, microchannel cold plates have significant temperature differences (hot spots) in the temperature contour in the "in-plate" direction perpendicular to the direction of microchannel flow of fluid through the cold plate blade. These hot spots are partially due to the small surface area for heat transfer to the microchannels and due to the strips with metal located between them. In contrast, the flow paths in parallel but opposite direction in adjacent channels, in the various example embodiments described herein, can be configured to minimize thermal gradients in the cold plate blade.

In an example embodiment, the cold plate blade has a plurality of battery cells, forming a battery pack, attached to the extruded plate, and the cold plate blade is mounted in a vehicle. The battery pack carrying cold plate blade can be installed in a mobile environment, or any other suitable system. In an example embodiment, a cooling system or "heat pump" is connected to the input port and output port of the cold plate blade. The cooling systems is configured to cause the working fluid to flow in a closed loop between the cold plate blade and a heat sink. For example, the cooling fluid may flow in a closed loop between the cold plate blade and a radiator. In an example embodiment, a fluid pump causes the working fluid to flow to, through, and away from the cold plate blade and to, through and away from the radiator back to the cold plate blade. Though generally useful for cooling the cold plate blade, the cooling system may be used in reverse to warm the cold plate blade.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, a thermal connection, and/or any other connection. When language similar to "at least one of A, B, or C" or "at least one of A, B, and C" is used in the specification or claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A method for manufacturing a cold plate, comprising:
   extruding a metallic material through a die to form an extruded plate;
      wherein the extruded plate comprises channels, formed by the extruding process, that extend from a first end of the extruded plate, linearly, to a second end of the extruded plate opposite the first end of the extruded plate;
      wherein the extruded plate comprises a top surface and a bottom surface, the bottom surface being co-planar to the top surface;
      wherein the channels are located in parallel with each other and between the top surface and the bottom surface; and
      wherein the channels are separated from each other by walls formed by the extruding process;
   the method further comprising:
   milling the first end of the extruded plate to form a first manifold;
   milling the second end of the extruded plate to form a second manifold;
   milling a first notch in the top surface over the first manifold;

milling a second notch in the top surface over one of the first manifold or the second manifold;

placing, in the first notch, a first port for inlet of a working fluid to the first manifold;

placing, in the second notch, a second port for outlet of the working fluid from one of the first manifold or the second manifold;

forming a first end cap and a second end cap; and welding the extruded plate, the first end cap, the second end cap, the first port and the second port to form a sealed enclosure, wherein the first end cap and the second end cap each comprise a flow directing structure that is inserted into the first manifold and the second manifold respectively to direct flow of the working fluid, wherein the extruded plate is a monocoque cold plate blade, comprising a structural skin, and wherein the cold plate has loads that are supported through the monocoque cold plate blade.

2. The method of claim 1, wherein:
the flow directing structure causes the working fluid from the first port to flow in a first channel and in a second channel that is adjacent to the first channel, linearly, in parallel, in the same direction, from the first end to the second end of the extruded plate.

3. The method of claim 1, wherein:
the flow directing structure causes the working fluid from the first port to flow in a first channel from the first end to the second end of the extruded plate, and then back from the second end to the first end of the extruded plate in an adjacent channel in a serpentine manner.

4. The method of claim 1, wherein:
the cold plate comprises a flow path, where the flow path is one of: linear, serpentine, cross flow, parallel and in series.

5. The method of claim 4, wherein:
the flow path is dependent on a structure of at least one of the first end cap and the second end cap.

6. The method of claim 1, wherein:
the extruded plate comprises a serpentine flow path created in part by at least one of the first end cap and the second end cap.

7. An apparatus for thermal management, comprising:
an extruded plate formed by extruding a metallic material through a die, the extruded plate comprising:
channels, formed by the extruding process, that extend from a first end of the extruded plate, linearly, to a second end of the extruded plate opposite the first end of the extruded plate;
a top surface and a bottom surface, the bottom surface being co-planar to the top surface, wherein the channels are located in parallel with each other, wherein the channels are located between the top surface and the bottom surface, and wherein the channels are separated from each other by walls formed by the extruding process;
a first manifold in the first end of the extruded plate, formed by removing material from the extruded plate at the first end;
a second manifold in the second end of the extruded plate, formed by removing material from the extruded plate at the second end;
the apparatus further comprising:
a first port that opens into the first manifold, the first port passing through one of the top surface and the bottom surface, for inlet of a working fluid to the first manifold;
a second port that opens into one of the first manifold and the second manifold, the second port passing through one of the top surface and the bottom surface for outlet to the working fluid from one of the first manifold or the second manifold;
a first end cap and a second end cap, wherein:
the extruded plate, the first end cap, the second end cap, the first port and the second port are welded to form a sealed enclosure,
the first end cap and the second end cap each comprise a flow directing structure that, when inserted into the first manifold and the second manifold respectively, direct flow of the working fluid, and
the extruded plate is a monocoque cold plate blade, comprising a structural skin, and
the apparatus has loads that are supported through the monocoque cold plate blade.

8. The apparatus of claim 7, wherein:
the flow directing structure causes the working fluid from the first port to flow in a first channel and in a second channel that is adjacent to the first channel, linearly, in parallel, in the same direction, from the first end to the second end of the extruded plate.

9. The apparatus of claim 7, wherein:
the flow directing structure causes the working fluid from the first port to flow in a first channel from the first end to the second end of the extruded plate, and then back from the second end to the first end in an adjacent channel in a serpentine manner.

10. The apparatus of claim 7, wherein:
the apparatus comprises a flow path, where the flow path is one of: linear, serpentine, cross flow, parallel and in series.

11. The apparatus of claim 7, wherein:
a flow path is dependent on a shape of the flow directing structure of at least one of the first end cap and the second end cap.

12. The apparatus of claim 7, wherein:
the extruded plate comprises a serpentine flow path created by at least one of the first end cap and the second end cap.

13. The apparatus of claim 7, wherein:
the first manifold is integrated with the extruded plate; wherein the second manifold is integrated with the extruded plate.

14. The apparatus of claim 7, further comprising battery cells, wherein the battery cells are bonded directly to the apparatus.

15. The apparatus of claim 7, further comprising battery cells, wherein the apparatus has a coating layer, and wherein the battery cells are bonded to the coating layer with an epoxy layer, and with no structure and with no second epoxy layer between.

16. An apparatus for thermal management, comprising:
a plate comprising:
channels that extend from a first end of the plate, linearly, to a second end of the plate opposite the first end of the plate;
a top surface and a bottom surface parallel to the top surface, wherein the channels are located in parallel with each other, wherein the channels are located between the top surface and the bottom surface, and wherein the channels are separated from each other by walls;
a first aperture in the first end of the plate;
a second aperture in the second end of the plate;
the apparatus further comprising:
a first port that opens into the first aperture, for an inlet of a working fluid to the first aperture; and a second port that opens into one of the first aperture and the second aperture for an outlet of the working fluid from one of the first aperture or the second aperture, wherein the first port is parallel to the channels and the second port is parallel to the channels, and wherein the first port and the second port are configured to turn the working fluid substantially 90 degrees, and wherein the plate is formed by one of: extrusion, stamping, or casting.

17. The apparatus of claim 16, further comprising:
a first end cap and a second end cap, and wherein the plate, the first end cap, the second end cap, the first port and the second port are connected to form a sealed enclosure.

18. The apparatus of claim 16, wherein the plate is formed by stamping a first half of the plate, wherein the first half of the plate is brazed to a second half of the plate, the plate further comprising a plurality of perturbances disposed in the channels.

19. The apparatus of claim 16, wherein the plate is formed by casting a first half of the plate, wherein the first half of the plate is brazed to a second half of the plate.

20. The apparatus of claim 16, wherein the plate further comprises a plurality of manifolds, each manifold comprising a plurality of the channels, the channels extending from a first side of the plate to a second side of the plate, wherein the apparatus further comprises:

a first side rail having a side rail inlet disposed proximate the first end of the plate; and a second side rail having a side rail outlet disposed proximate the second end of the plate, wherein each manifold has the first port disposed within the first side rail and in fluid communication with the side rail inlet, and wherein each manifold has the second port disposed within the second side rail and in fluid communication with the side rail outlet.

* * * * *